Nov. 14, 1933.     H. RUSCHER     1,935,378
TOKEN DEVICE
Filed March 1, 1930     14 Sheets-Sheet 1
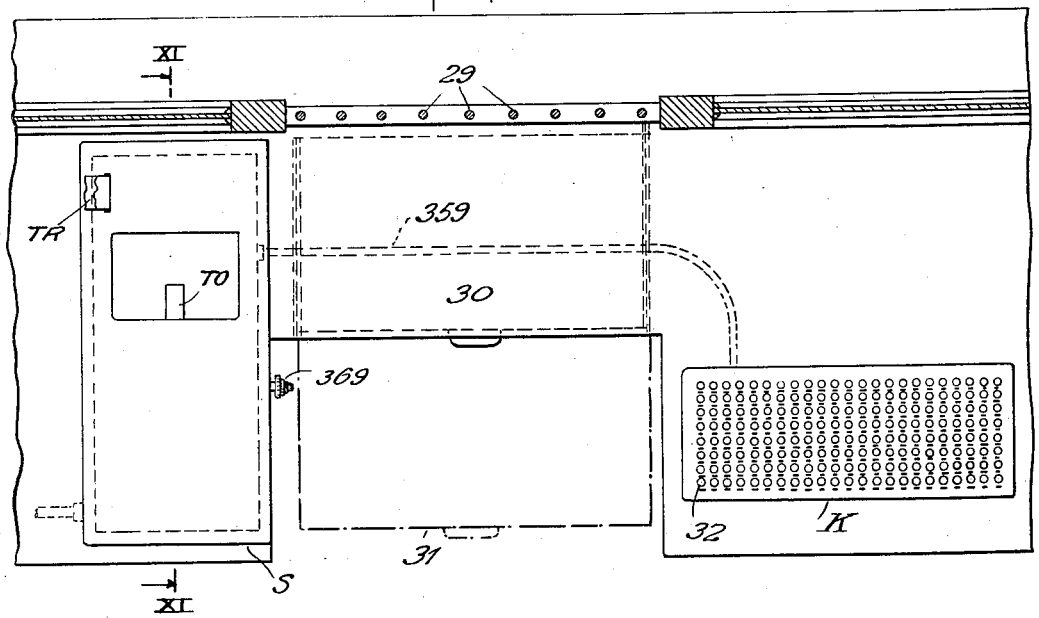
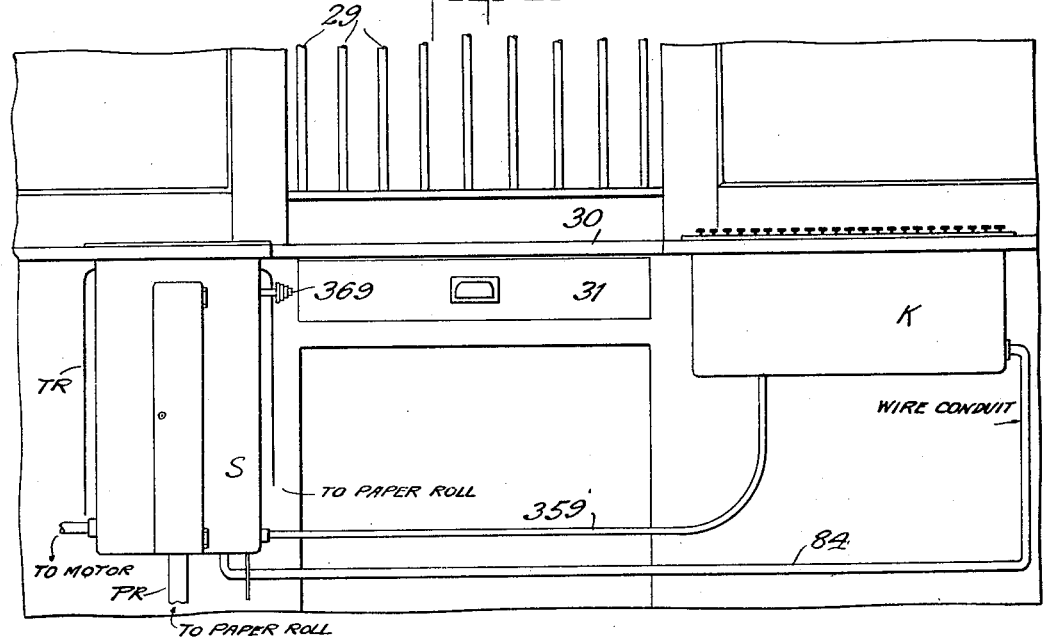
INVENTOR
Harold Ruscher
BY
Lyman E. Dodge
ATTORNEY Nov. 14, 1933.  H. RUSCHER  1,935,378
TOKEN DEVICE
Filed March 1, 1930  14 Sheets-Sheet 2
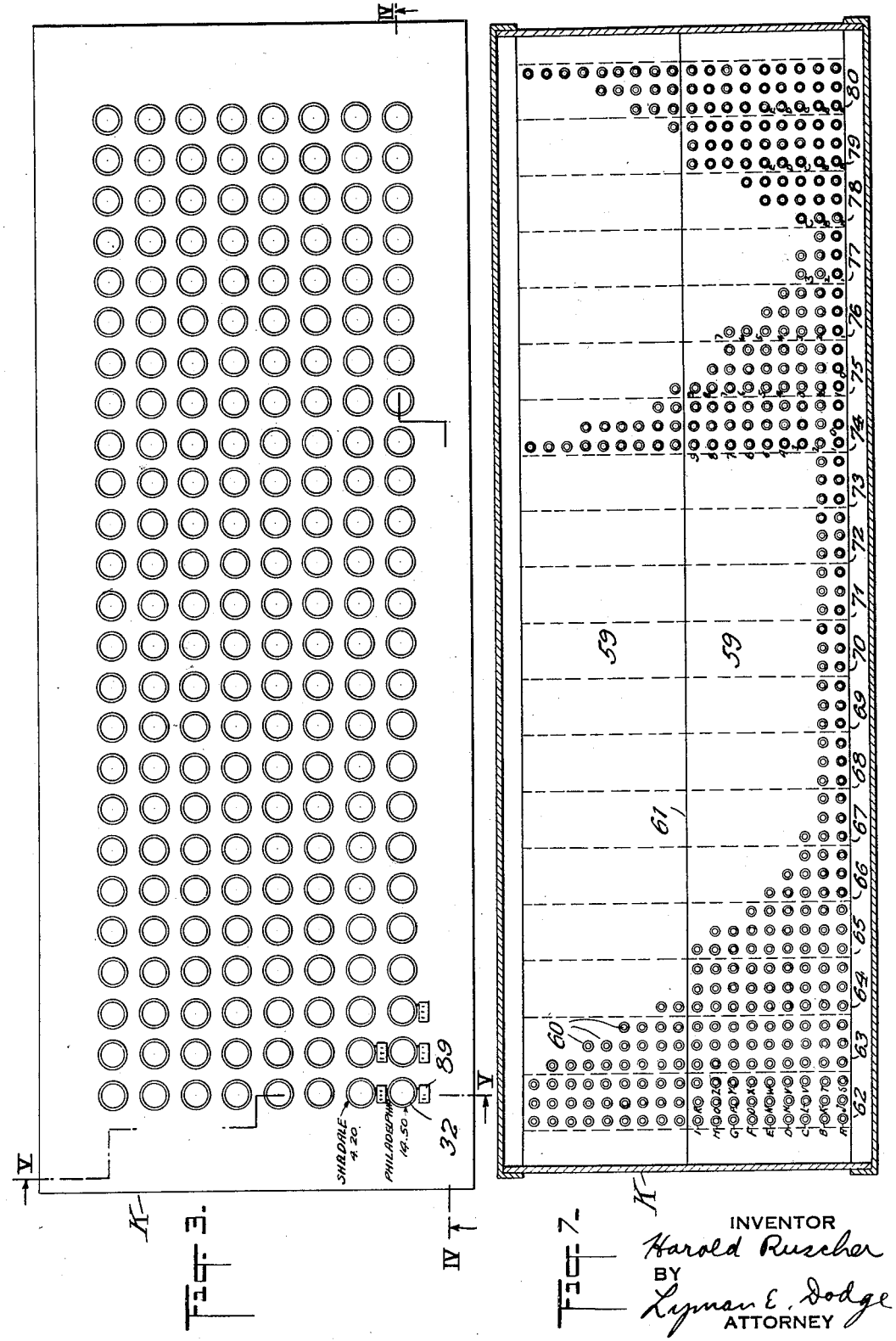
INVENTOR
Harold Ruscher
BY
Lyman E. Dodge
ATTORNEY

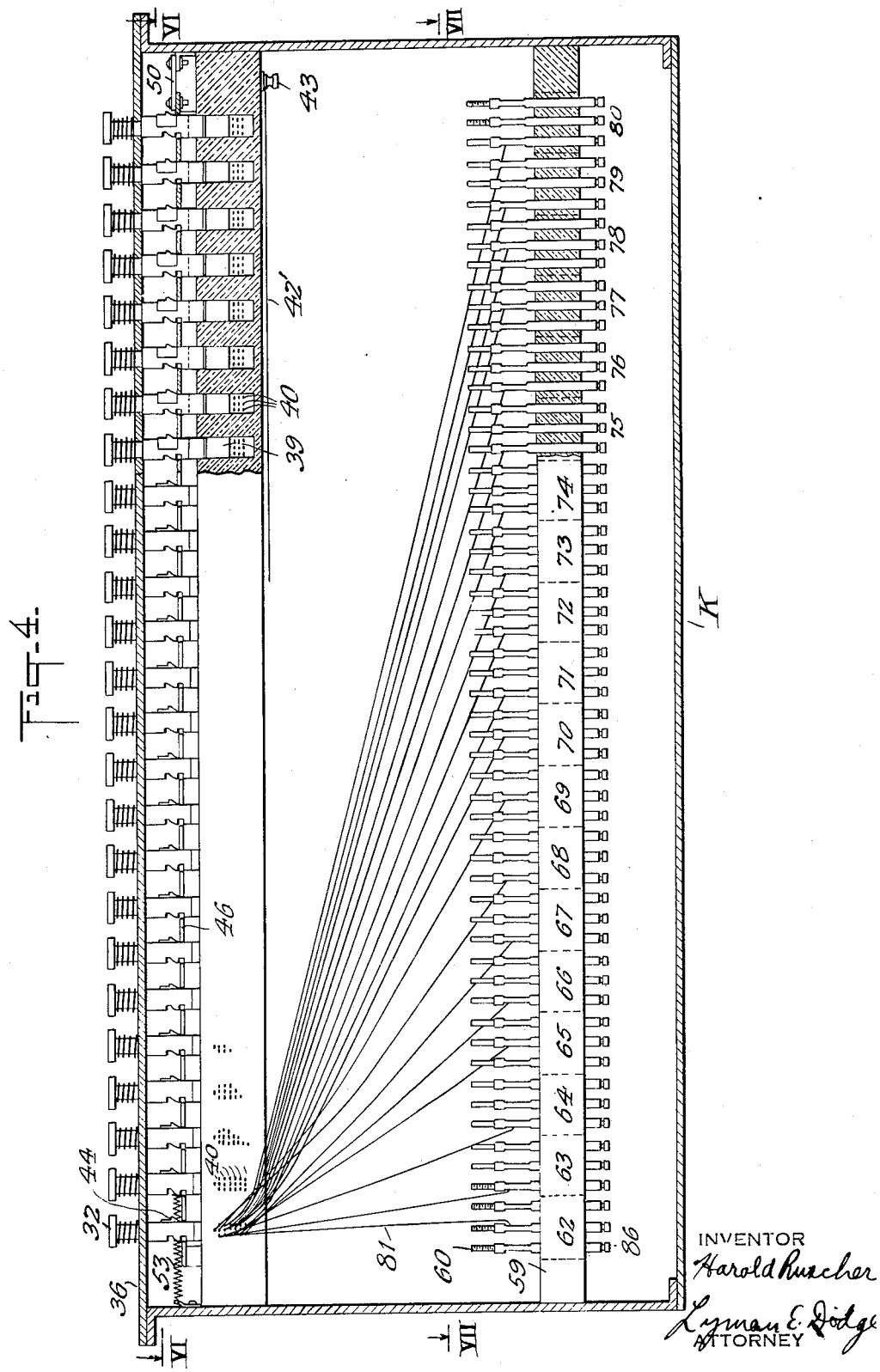

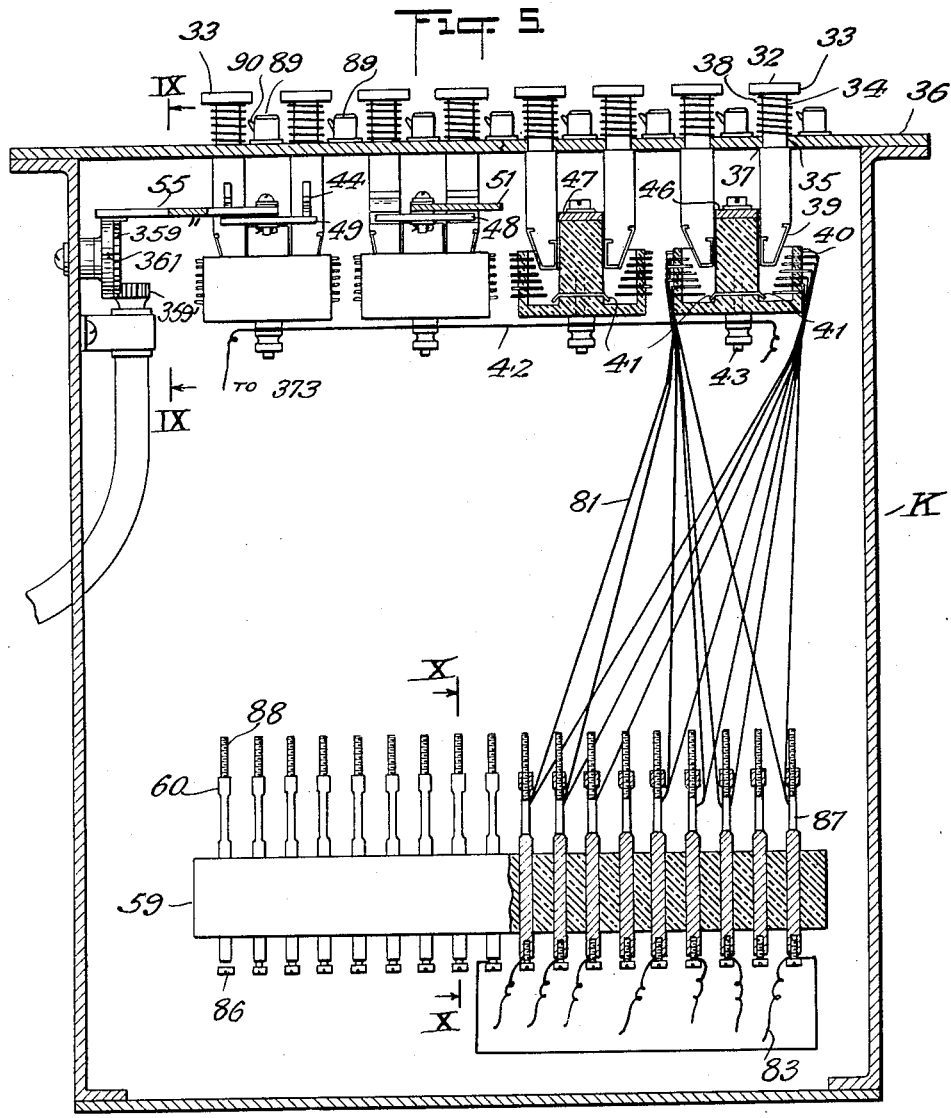
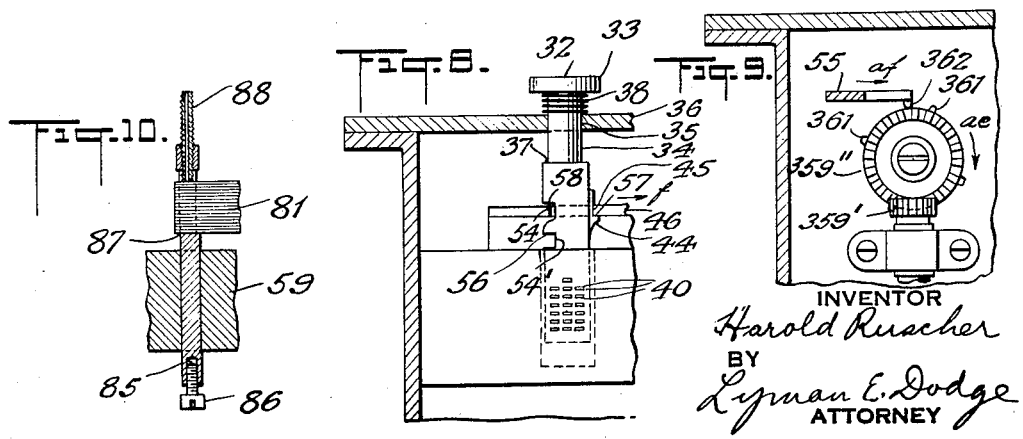

Nov. 14, 1933.  H. RUSCHER  1,935,378
TOKEN DEVICE
Filed March 1, 1930   14 Sheets-Sheet 5
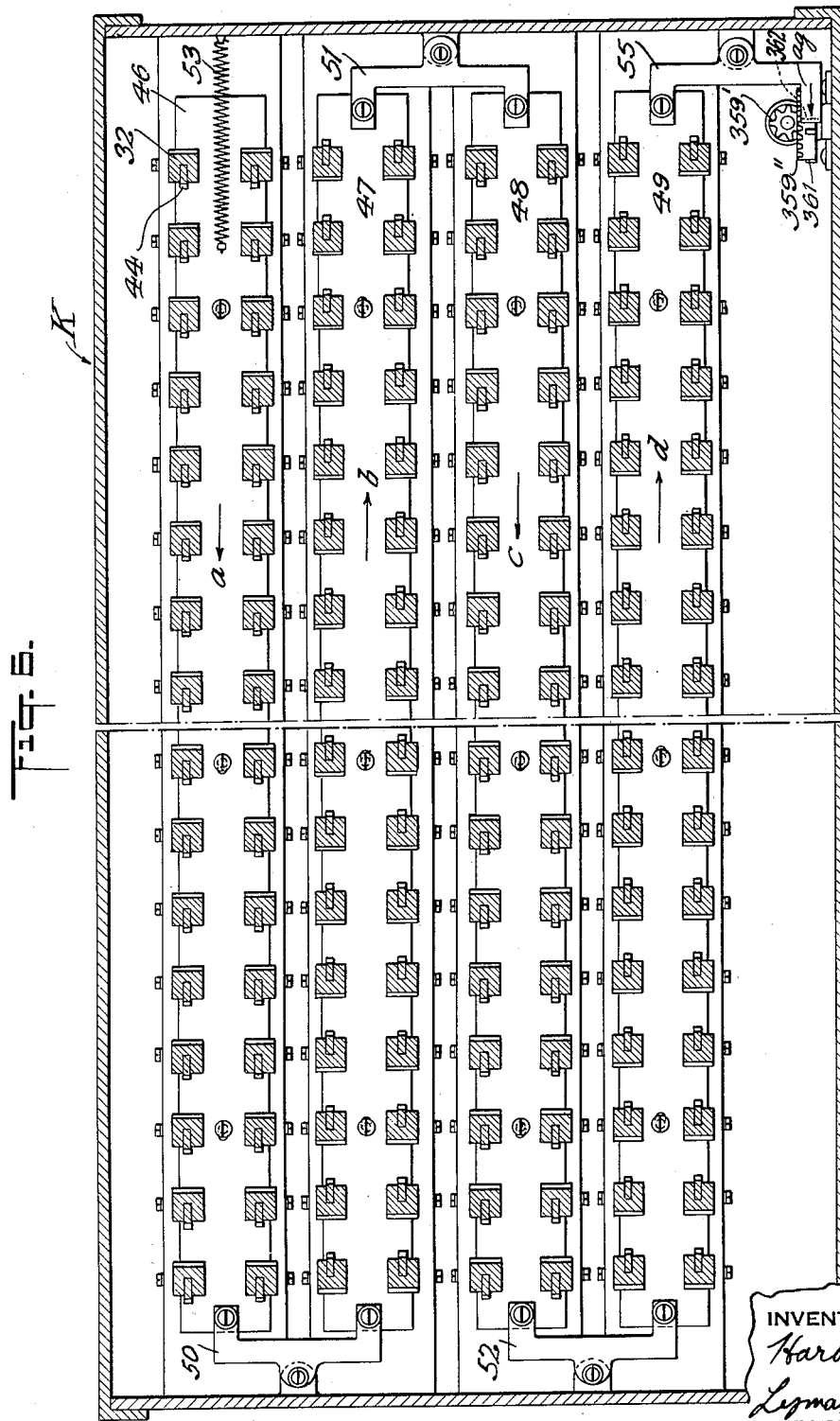

Nov. 14, 1933.  H. RUSCHER  1,935,378
TOKEN DEVICE
Filed March 1, 1930    14 Sheets-Sheet 6
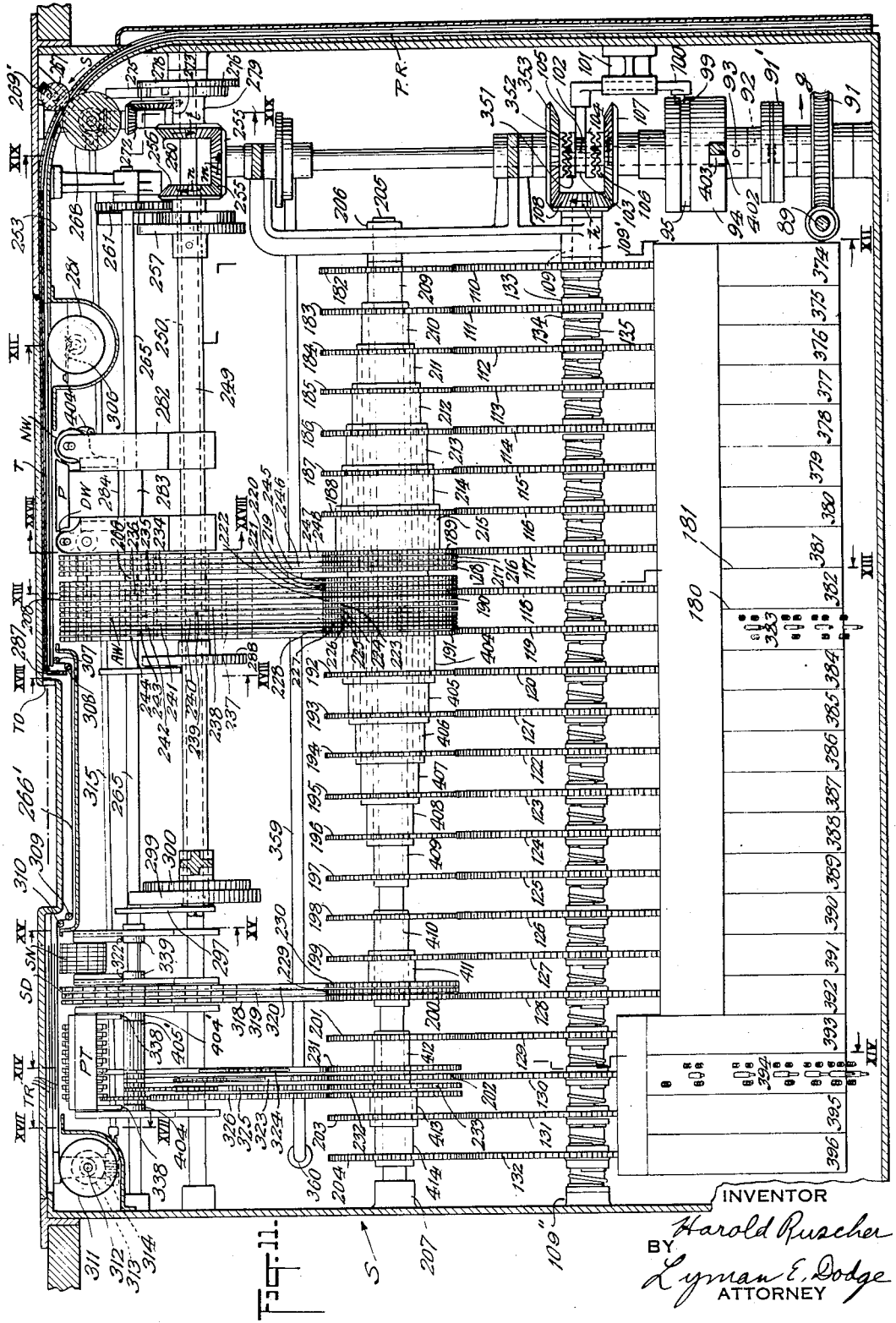
INVENTOR
Harold Ruscher
BY
Lyman E. Dodge
ATTORNEY

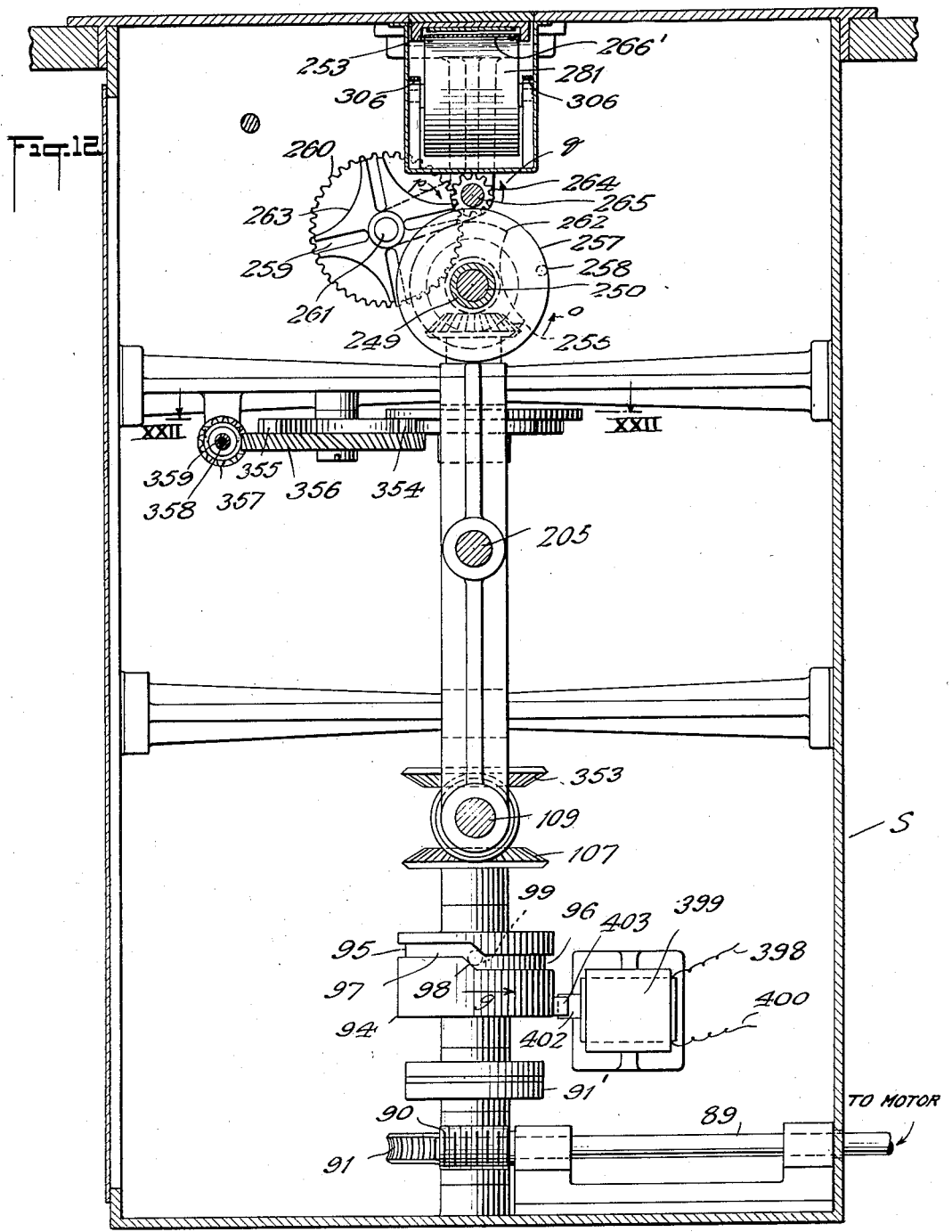

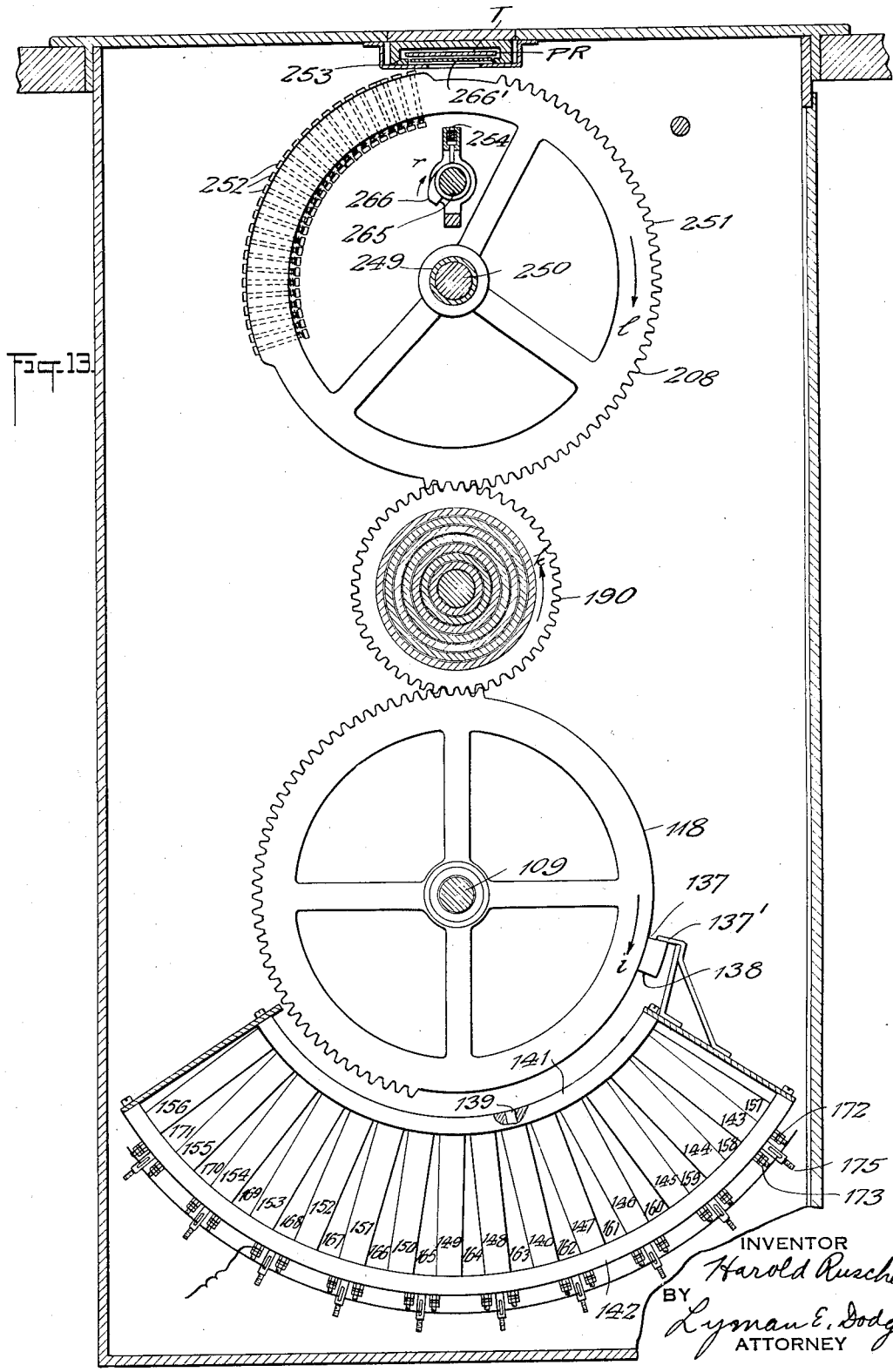

Nov. 14, 1933.  H. RUSCHER  1,935,378
TOKEN DEVICE
Filed March 1, 1930  14 Sheets-Sheet 9
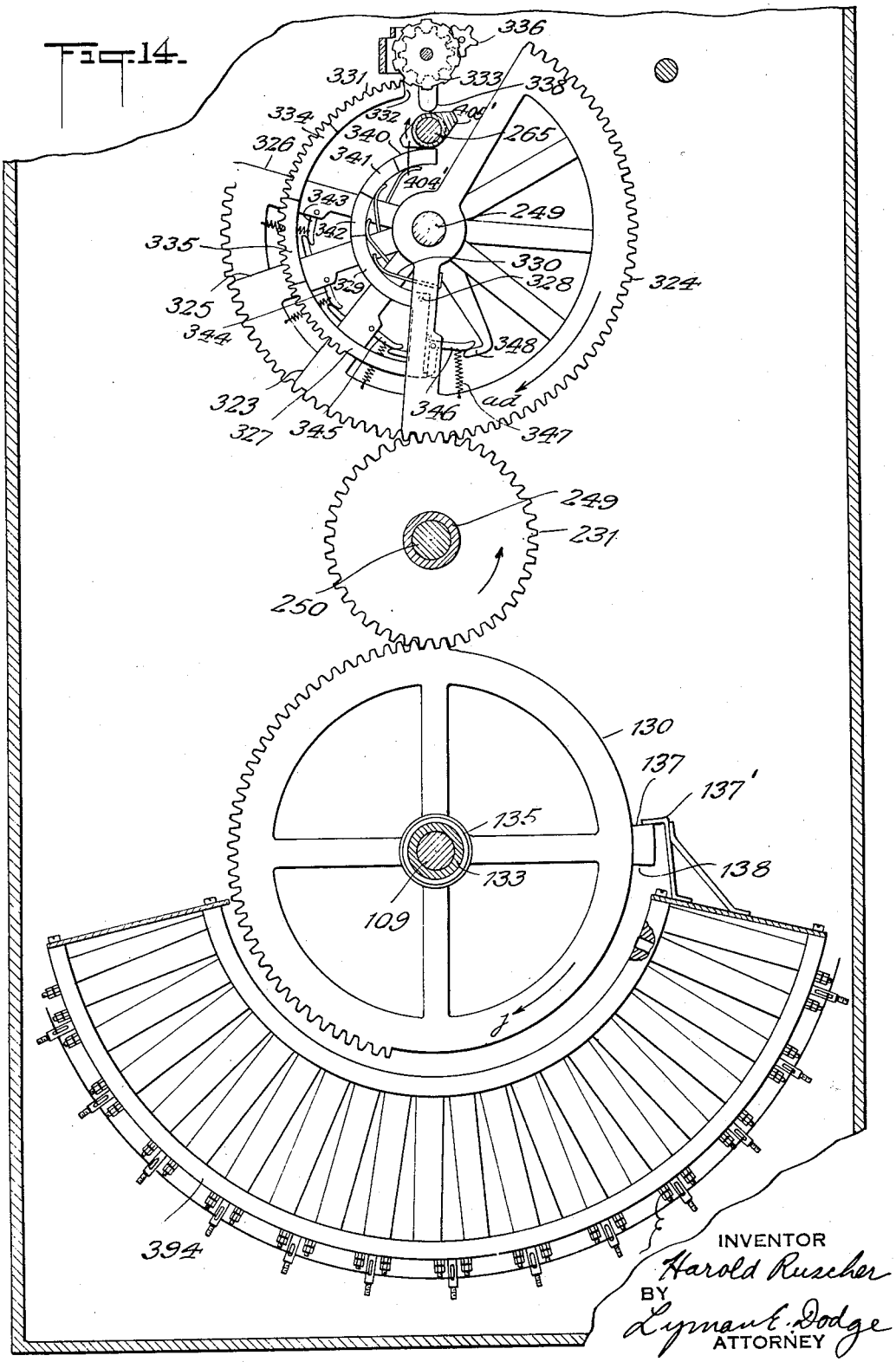

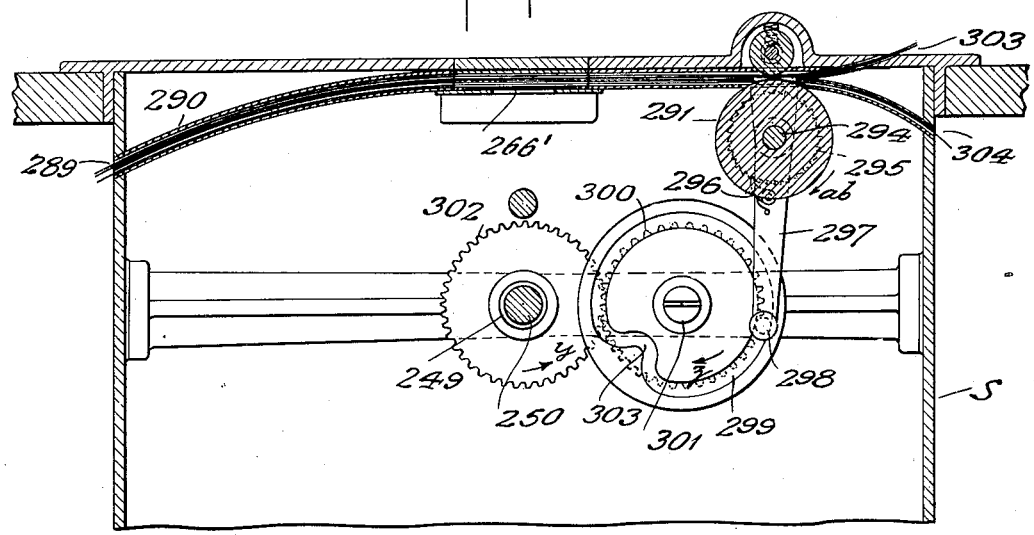
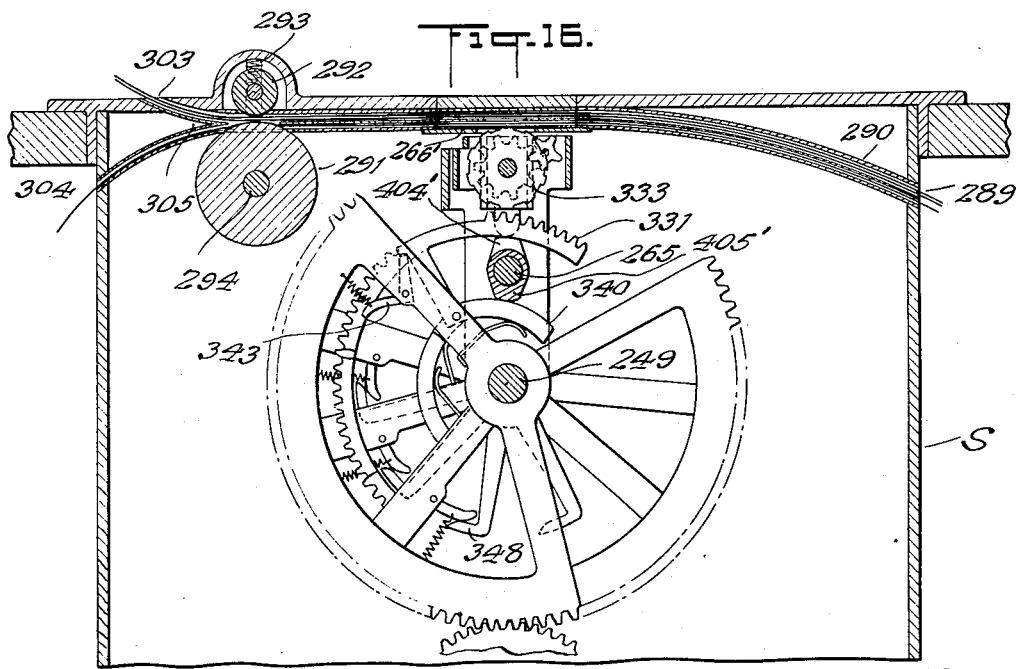

Nov. 14, 1933.  H. RUSCHER  1,935,378
TOKEN DEVICE
Filed March 1, 1930   14 Sheets-Sheet 11
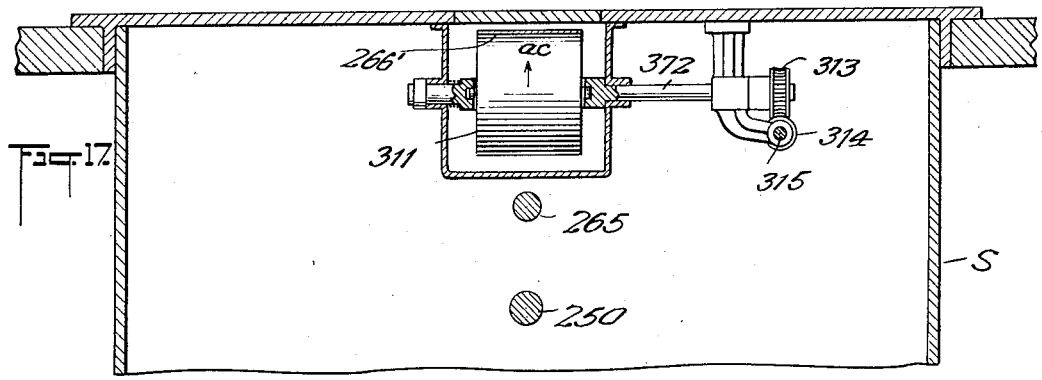
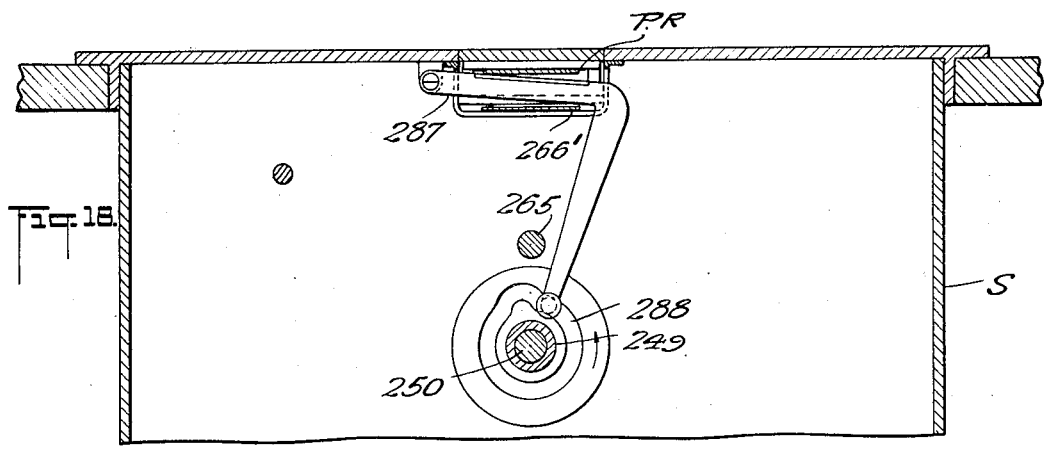
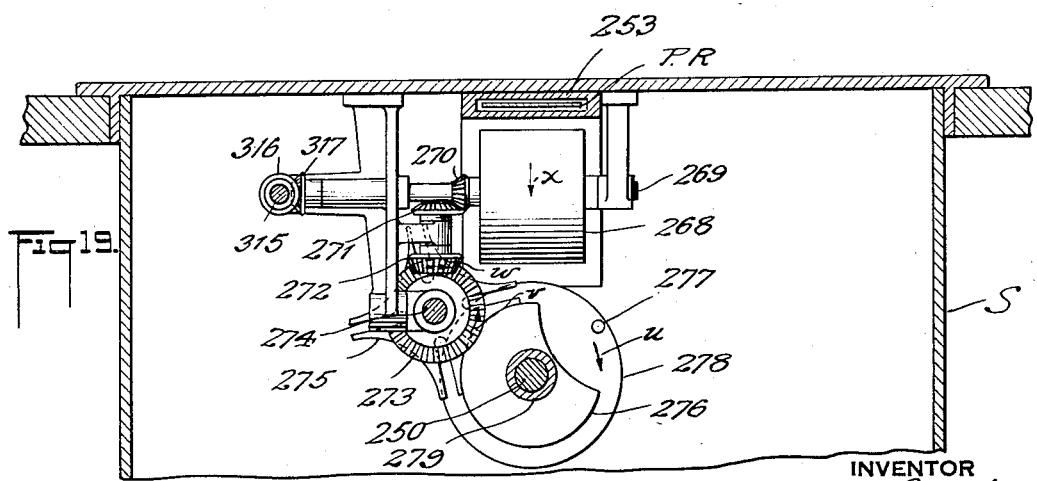

Nov. 14, 1933.  H. RUSCHER  1,935,378
TOKEN DEVICE
Filed March 1, 1930  14 Sheets-Sheet 12
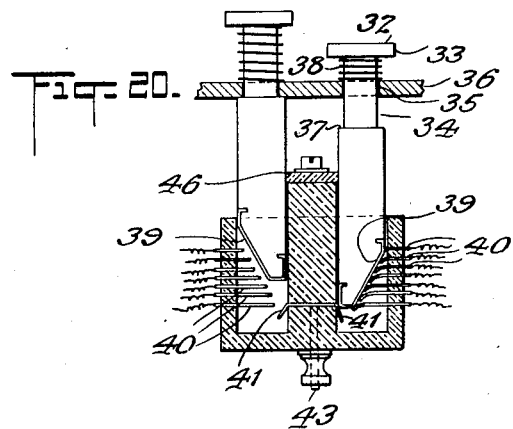
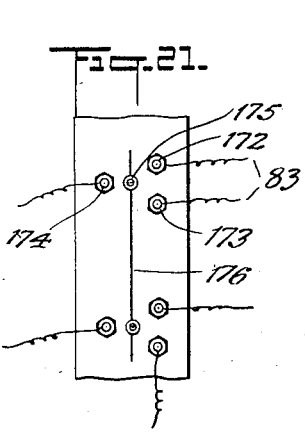
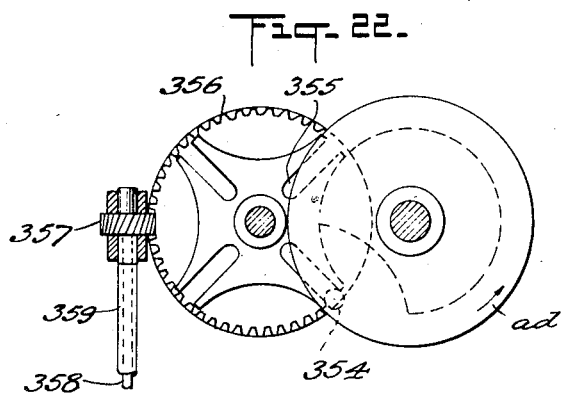
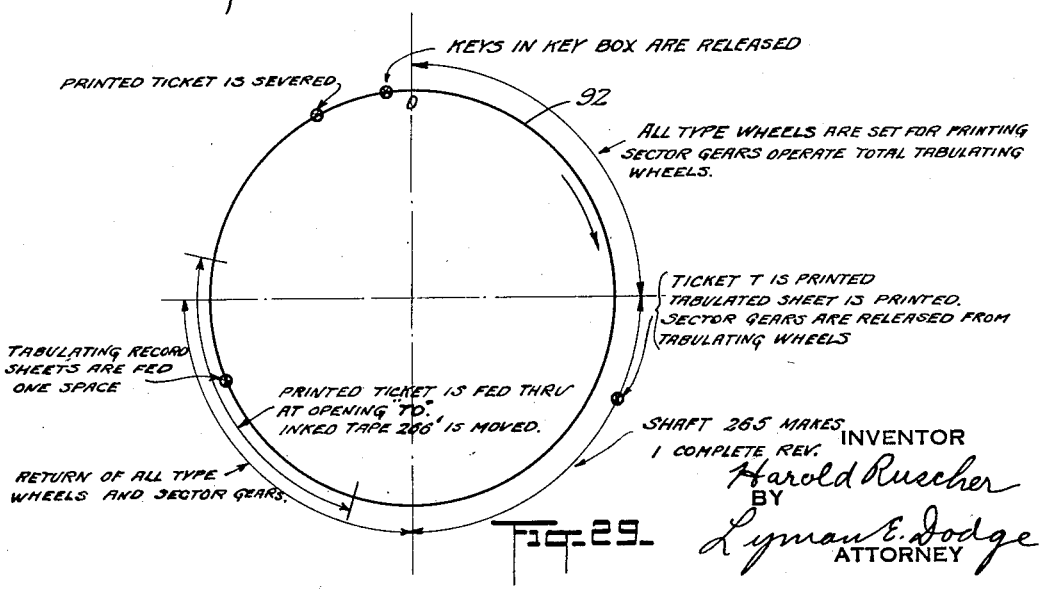

Nov. 14, 1933.  H. RUSCHER  1,935,378
TOKEN DEVICE
Filed March 1, 1930     14 Sheets-Sheet 13
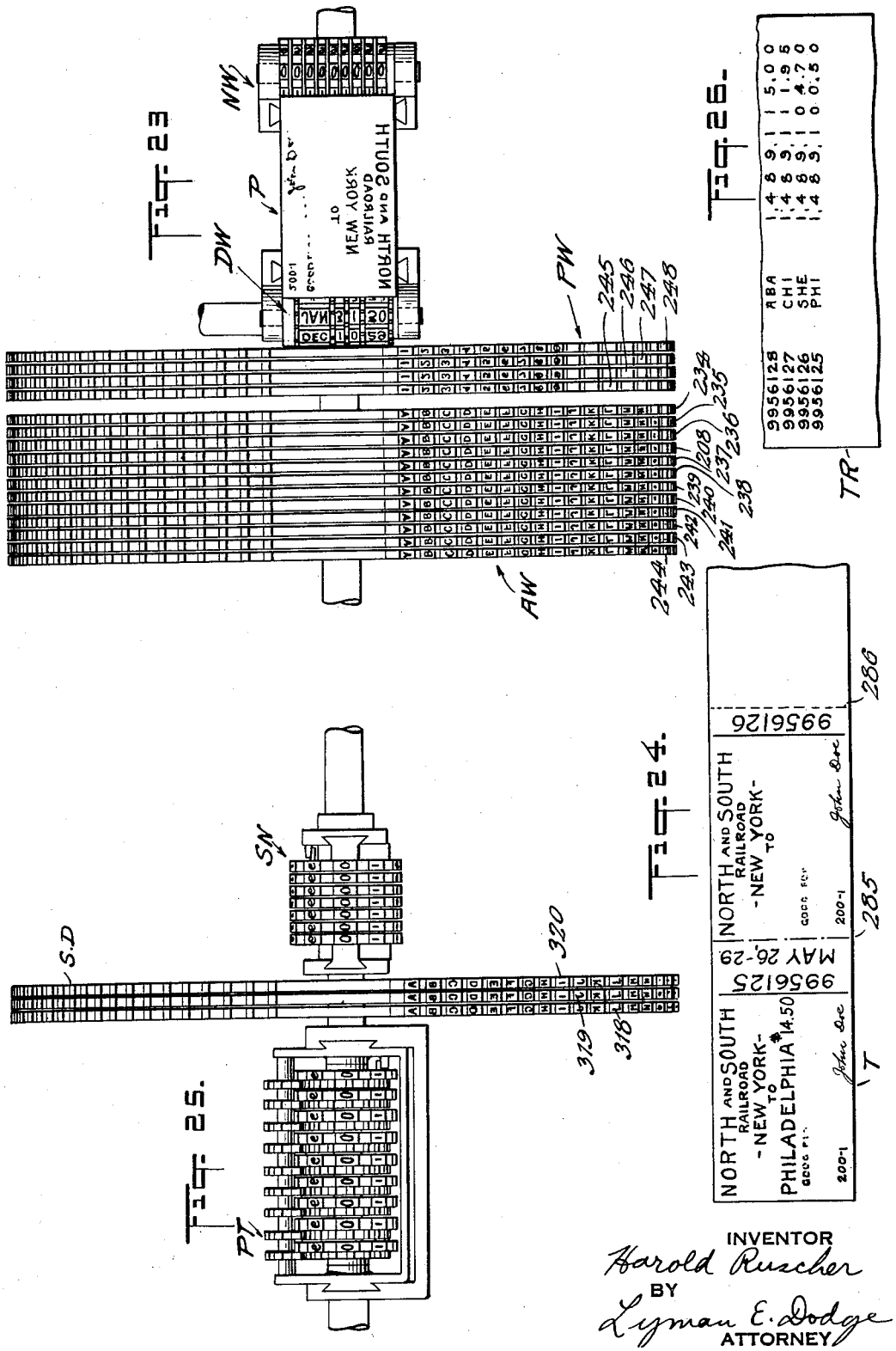
INVENTOR
Harold Ruscher
BY
Lyman E. Dodge
ATTORNEY

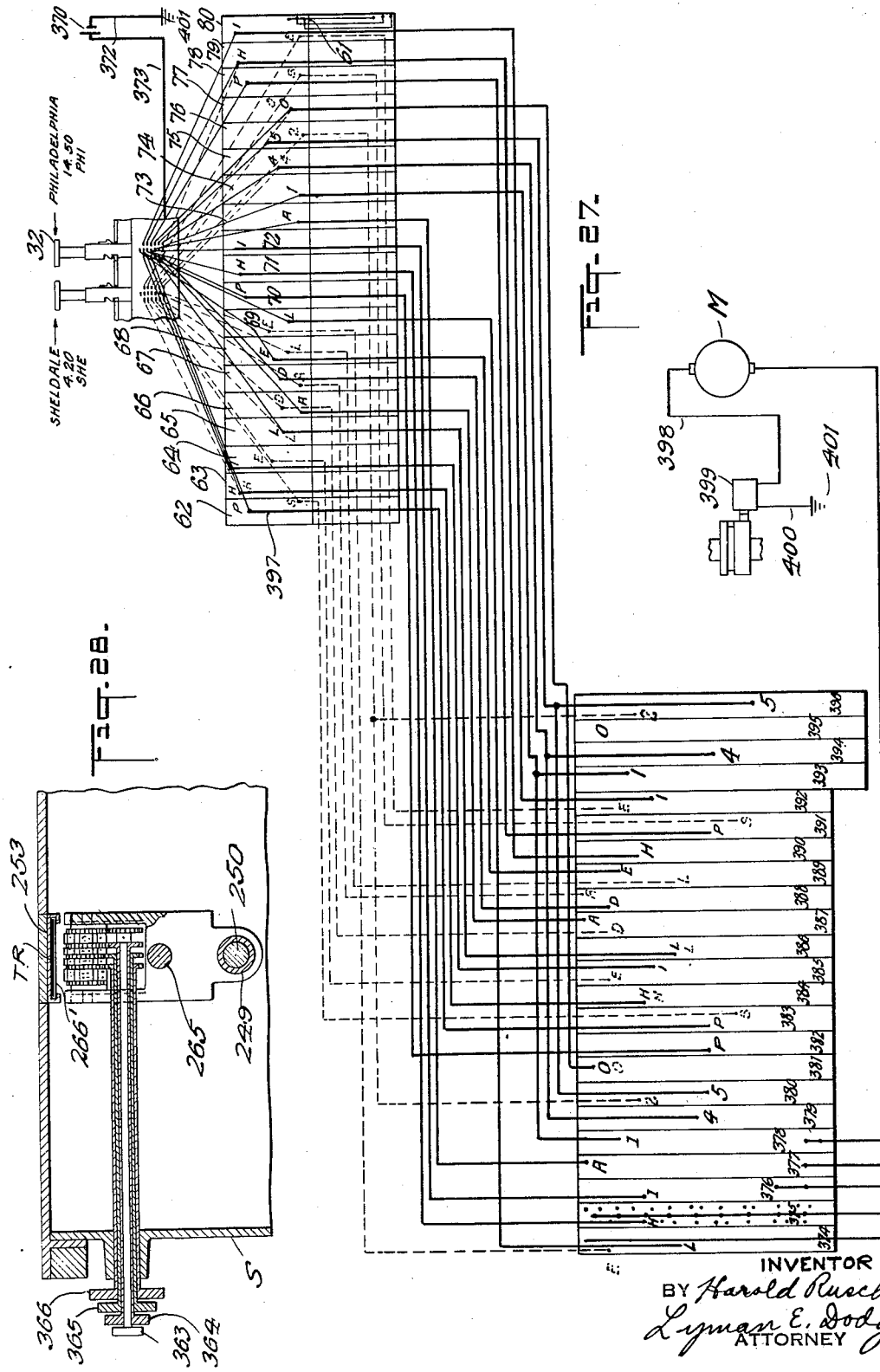

Patented Nov. 14, 1933

1,935,378

UNITED STATES PATENT OFFICE 1,935,378

TOKEN DEVICE

Harold Ruscher, New York, N. Y., assignor of one-half to Dorothy M. Ruscher, Mount Vernon, N. Y.

Application March 1, 1930. Serial No. 432,572

30 Claims. (Cl. 101—68)

This invention relates to a method and a means for the production of tokens; particularly, such tokens as are issued by transportation companies as evidence of right to transportation; and more especially, to such tokens as are issued by railways, and commonly called passenger tickets.

Tokens are generally issued to persons as evidence of a right to enjoy the benefit of facilities provided by others. Each amusement purveyor, boat operator, or the like commonly employs tokens as a means for facilitating his transactions with others. Railway operators are the most extensive users of tokens, known commonly as railway, passenger, or transportation tickets.

Some of the larger railways provide numerous points of departure and destination, known as stations. Each station, being generally a sales office, requires a supply of many kinds of tickets. Generally, it must have tickets providing evidence of transportation from it to each other station of the railway. This supply must be maintained substantially intact.

In order to successfully provide a ticket seller with the necessary tickets, and maintain his stock substantially intact, it has been found necessary to have cooperative action of the ticket selling office, and a general ticket supply and accounting office.

The general ticket supply and accounting office must arrange to have printed, tickets in varieties and number sufficient to promptly supply the periodical demands of each of the ticket selling offices.

The general ticket supply office must engage a printer whose integrity is such that there is no fear that, either he or his assistants will allow the plates, or the type from which the tickets are printed to be used to print unauthorized tickets; or allow any tickets printed from the plates or type to come into the hands of any unauthorized person. All tickets received from the printer must be carefully counted and a record thereof made. All tickets sent to each selling office must be carefully counted and a record thereof made.

The selling offices must make periodical inspection of the supply of tickets on hand, and promptly requisition such further tickets as may be needed to maintain the stock intact. The selling office must each day render to the accounting department a statement of the number and the varieties of tickets sold each day, and transmit with such statements the equivalent in cash.

A check upon the proper performance of the duties of each of the selling offices and the general ticket supply and accounting office must be made periodically by the auditing department. In order to do this, the accounting, both of the ticket selling office and the general ticket supply and accounting office, must be carefully and searchingly inspected; and the quantities, of the various kinds of tickets on hand in the ticket selling offices and the general ticket supply and accounting office, must also be checked, together with the monies forwarded, by the ticket selling offices to the accounting offices, since the time of the last audit.

It is quite clear then, that the present system of making, distributing, and selling tickets on railways requires a considerable overhead expenditure for clerks and auditors. It is further to be seen, that the work of the traveling auditors is quite time consuming, as it is necessary for the traveling auditors to satisfy themselves as to the exact number of tickets on hand in a selling office which they are inspecting, and that this sometimes requires actual count of a large number of tickets of various kinds.

The present system of using tokens is further objectionable because, in case of a fire in a selling office, no check can be made of the tickets which were on hand in that office. Furthermore, many of the tickets may fall into the hands of unauthorized persons during the course of the fire, and be later used to the detriment of the railway.

Another difficulty with the present system is, that as the price of the ticket is not printed thereon, it is possible for a dishonest ticket seller to overcharge a purchaser. The price is not printed thereon because, in case a universal rate change is made, it would be necessary to call in all of the outstanding tickets and replace them by an entirely new supply. This operation would be extremely expensive and very troublesome.

The present system also requires a very considerable number of blank forms to facilitate the different transactions involving the tickets, and a very considerable expenditure for furniture in which the tickets are arranged and securely retained in the various offices.

It is a principal object of this invention to eliminate most of the difficulties of the present system of dispensing tickets by providing a method and a means, in physical embodiment, of a type such that tickets in their complete form may be produced as needed from practically worthless material.

A further object of this invention is the production of a ticket, as needed, by a single manual operation.

A further object of this invention is to produce, simultaneously with the ticket, a record which will exhibit the price which should be paid for the ticket and the proper sequential number of the ticket.

A further object of this invention is to produce a ticket, as needed, with the proper selling price appearing thereon.

A further object of this invention is the production of a machine of the type stated such that, if a change in rate is made for one ticket or all possible tickets, the machine may be quickly and conveniently altered so that the selling price at the new rate will appear properly on each ticket.

A further object of this invention is the production of a machine of the type stated such, that when desired, by a simple manipulation a change can be made so that a ticket when produced will bear a desired calendar date.

A further object of this invention is the production of a machine of the type stated which will simultaneously make a record in triplicate showing the sequential number of the ticket, the destination exhibited on the ticket, and a total, with sums previously received for tickets, of the sum paid for the ticket, to the end that one of the triplicate records may be left in the machine, one may be retained by the ticket seller, and the third may be forwarded, with the cash received for tickets, to the general accounting office.

A further object of this invention is the production of a machine of the type stated which will be of a convenient and adaptable size to be installed in the usual place now occupied and used by sellers in dispensing tickets.

A further object of this invention is the production of a machine of the type stated which will be so constructed that only a single manually operable part, must be operated to produce a ticket, and when that part has been so operated to produce a ticket, corresponding parts for producing other tickets may not be operated until the first desired ticket has been entirely produced, and, meanwhile, the operated part will be retained in operated position.

A further object of this invention is the production of a machine of the type stated which may be readily adapted by additions or subtractions to either offices selling a very large number of different kinds of tickets or to selling offices dispensing only a very small number of different kinds of tickets.

A further object of this invention is the provision of a method and means whereby equal facility and greater efficiency than the present method of dispensing tickets may be accomplished with a very much less force of clerks.

A further object of this invention is the production of a method and means for producing a ticket as needed which will require for its continued operation supplies of material which are of such a character, that their loss in transit, or their possession by unauthorized persons, will result in no great financial loss to the railway, or which in case of a fire in a selling office will not furnish an attractive object for seizure by a dishonest person.

A further object of this invention is the production of a machine of the type stated which includes the necessary devices for securing such statistical data as a railroad management may require, in order to be properly advised, as to the facts pertaining to the operation of the road regarding tickets.

A further object of this invention is the production of a method and a machine for producing tickets as needed which will obviate all necessity for a traveling auditor counting or checking a large number of tickets on hand in a selling office.

Other objects and advantages will appear as the description of a particular physical embodiment selected to illustrate this invention progresses and the novel features thereof will be particularly pointed out in the appended claims.

This invention in its broadest aspect consists in a method for the production of tokens and an idea of means which, in a physical embodiment, includes mechanism manually operable to set in motion motive power means which in turn operate further mechanism selectively limited in its movement by the manually operable means and after being selectively positioned caused to impress indicia upon a limited section of material forming a token, preferably part of a roll, and then to advance the token to a position where it may be severed and manually received.

This invention further contemplates and includes, in its preferred form, a simultaneously produced record, preferably upon a ribbon of intermittently advanced paper, of the sum total of the price of all tokens issued, the sequential number of each token, together with an indication of the destination shown upon the token.

This invention consists not only of the broad combinations mentioned but also of various subcombinations and mechanical assemblages.

In describing this invention in detail, and the particular physical embodiment selected to illustrate this invention, reference will be had to the accompanying drawings, and the several views thereon, wherein like characters of reference will designate corresponding parts throughout the several views, and in which:

Figure 1 is a fragmentary top plan view, with some parts in section, illustrating an embodiment of my invention in a preferred position in a ticket office; Fig. 2 is a fragmentary elevational view of the arrangement shown by Fig. 1; Fig. 3 is a top plan view of a mechanism of my invention, called a key box, by me; Fig. 4 is an elevational longitudinal sectional view on the plane indicated by the line IV—IV of Fig. 3, viewed in the direction of the arrows at the ends of the line; Fig. 5 is an elevational transverse sectional view on the plane indicated by the line V—V of Fig. 3, viewed in the direction of the arrows at the ends of the line; Fig. 6 is a top plan longitudinal horizontal sectional view on the plane indicated by the line VI—VI of Fig. 4, viewed in the direction of the arrows at the ends of the line and as placed upon the sheet turned through a horizontal angle of 180 degrees from the position of the device as shown by Fig. 4; Fig. 7 is a top plan longitudinal horizontal sectional view on the plane indicated by the line VII—VII of Fig. 4, viewed in the direction of the arrows at the ends of the line; Fig. 8 is an enlarged fragmentary elevational view of one of the keys of the key box, Fig. 3, viewed from the same position as shown in Fig. 4; Fig. 9 is a fragmentary elevational longitudinal sectional view on the plane indicated by the line IX—IX of Fig. 5, viewed in the direction of the arrows at the ends of the line; Fig. 10 is a fragmentary elevational sectional view of a wire binding post and support on the plane indicated by the line X—X of Fig. 5, viewed in the direction of the arrows at the ends of the line; Fig. 11 is a partly elevational and partly longitudinal sectional view of what I term the selecting and printing mechanism, on the plane indicated by the line XI—XI of Fig. 1 viewed in the direction of the arrows at the ends of the line; Fig. 12 is an elevational vertical transverse sectional view on the plane indicated by the line XII—XII of Fig. 11, viewed in the direction of the arrows at the ends of the line; Fig. 13 is a vertical transverse sectional view on the plane indicated by the line XIII—XIII of Fig. 11, viewed in the direction of the arrows at the ends of the line; Fig. 14 is a fragmentary vertical transverse sectional view on the planes indicated by the line XIV—XIV of Fig. 11, viewed in the direction of the arrows at the ends of the line; Fig. 15 is a fragmentary vertical transverse sectional view on the plane indicated by the line XV—XV of Fig. 11, viewed in the direction of the arrows at the ends of the line; Fig. 16 is a fragmentary vertical transverse sectional view on the plane indicated by the line XV—XV of Fig. 11, viewed in the opposite direction of the arrows at the ends of the line, and illustrating a position of the parts somewhat different from identical parts appearing in Fig. 14, near the top thereof; Fig. 17 is a fragmentary transverse vertical sectional view on the plane indicated by the line XVII—XVII of Fig. 11, viewed in the direction of the arrows at the ends of the line; Fig. 18 is a fragmentary transverse vertical sectional view of the line XVIII—XVIII of Fig. 11, viewed in the direction of the arrows at the ends of the line; Fig. 19 is a transverse vertical sectional view of the plane indicated by the line XIX—XIX of Fig. 11, viewed in the direction of the arrows at the ends of the line; Fig. 20 is a fragmentary enlarged end elevational and transverse sectional view of the keys of the key box and their associated electrical contact members viewed from the same position as are the like parts, as shown in Fig. 5; Fig. 21 is a fragmentary elevational view showing the electrical connections to some of numerous solenoids used with my invention; Fig. 22 is a fragmentary horizontal sectional view on the plane indicated by the line XXII—XXII of Fig. 12, viewed in the direction of the arrows at the ends of the line, of a portion of what I term the key releasing mechanism of my invention; Fig. 23 is a fragmentary top plan view of a part of that portion of the mechanism of my invention which impresses a token with the various and needed indicia; Fig. 24 is an illustration of partially and completed formed tokens; Fig. 25 is a fragmentary top plan view of a part of that portion of the mechanism of my invention which forms a permanent record, on a material such as paper tape, of the sequential number of tokens issued for transportation, to what stations, and the amount of the total monies which should have been received; Fig. 26 is an illustration of a fragment of a paper tape with the permanent record thereon; Fig. 27 is a schematic view illustrating the connections for the electrical circuits connecting the keys in the key box, solenoids in the selecting and printing mechanism box and an electric motor driving means; Fig. 28 is a fragmentary vertical cross-sectional view on the plane indicated by the line XXVIII—XXVIII of Fig. 11, viewed in the direction of the arrows at the ends of the line; Fig. 29 is a schematic or operation diagram illustrating a complete cycle of applicant's device and the time and position in the cycle at which the various functions are performed.

Ignoring details, the general operation of the arrangement shown in the drawings, as a particular physical embodiment of applicant's invention, consists first in a manual depression of a desired one of the group of keys projecting from the key box K of Fig. 1. The depression of this key completes partial electrical circuits which cause the motor M of Figure 27 to be energized. The energization of motor M causes, through the agency of the complicated mechanism particularly shown in Fig. 11, a proper positioning and movement of impression producing instrumentalities which impress a definite section of token forming material with the desired indicia and a paper tape with the desired factual record. The completed token is illustrated in Fig. 24 and is designated T. This token has all of the characters appearing thereon impressed thereon by this machine. The impression producing means are all shown in Fig. 23. The sequential number 9,956,125, on the token, is produced by the number wheels NW; the date is produced by the date wheels DW; the destination is produced by the alphabet wheels AW; the price by price wheels PW; the remainder of the characters are produced by the printing plate P. When all of the characters have been formed upon the token, it is severed along the dotted line just to the right of the date, as shown by dot and dash line 285 in Fig. 24. At the same time that the token is produced a triplicate record is formed upon a paper tape. A fragment of tape designated TR is shown in Fig. 26. The letters and figures are formed on this paper tape by the impression producing means shown in Fig. 25. The sequential numbers, as 9,956,125, on the tape record, are produced by the sequential number wheels SN; the station designation, such as ABA, is produced by the station designation wheels SD; and the total receipts for tokens is produced by the price total wheels PT. The token, when completed, issues from the top of the selector and printing box S through the slot space TO as shown in Fig. 1; and, as also shown in Fig. 1, two of the copies of the tape record TR issue from another slot to the left of and a little beyond the token slot.

In describing the invention in detail reference will first be had to Fig. 1. In Fig. 1 the general arrangement of a ticket selling office or window has been illustrated with applicant's invention placed in the preferred position in connection therewith. A prospective customer approaches the window and stands on the outside of the bars 29 to make known his wants. The ticket seller is positioned on the inside of the bars 29 with the counter 30 in front of him and a money drawer 31 positioned under the counter. On the right hand side of the ticket seller is the key box K and on the left hand side of the seller is the selector and printing box S having in its top surface the token issuing orifice TO and the slot for the emergence of two of the triplicate permanent or tape records TR. With all of the parts so disposed, a customer's desire for a ticket entitling him to enjoy the privilege of transportation to a stated destination is quickly and efficiently complied with. The ticket seller depresses that key in the key box K which is assigned to the production of tokens showing upon their face the right of transportation of a passenger to the desired destination. After the particular key of the key box K has been depressed the ticket seller may state the price, knowing the same by reason of data on the key, and have the prospective customer pass the necessary amount of money past the bars 29. Before the necessary monetary transactions have been completed, the desired token will issue at the token orifice TO and may be then immediately handed to the customer who by an inspection thereof may ascertain that the token grants the privilege of transportaion to the desired destination and indicates thereon the price which has been charged by the ticket seller.

In order to most clearly and fully explain the mode of operation of the particular embodiment of applicant's invention selected for illustration it seems best to follow out the operation of the mechanism in producing a token granting the right of transportation to a definite destination. This destination will be selected as Philadelphia and it will be assumed that the point of departure is New York.

If a prospective customer desires a token evidencing his right to transportation from New York to Philadelphia, the ticket seller will manually depress, to its fullest extent, the Philadelphia key in the key box K, as shown by Fig. 3. The lower left hand key 32 has been assigned to the destination Philadelphia as indicated just above and to the left thereof, it being understood that in practice each key will be suitably marked so as to give information as to the destination to which it has been assigned and the rate.

Keys, as 32, are formed with an enlarged top or finger piece 33, as well shown in Fig. 5. Below the finger piece the particular keys shown are reduced in diameter, as at 34, and made circular in cross-section, snugly fitting a correspondingly shaped orifice 35 in the top plate 36 of the key box K. Below the top plate 36 each key is formed with a shoulder 37. The shoulder 37 limits the upward movement of the key 32 caused by the expansion spring 38 positioned between the top surface of the plate 36 and the end surface of the finger piece 33. From the description it will be readily apparent that each key as 32 may be pushed downwardly by a manual operation and will be restored to the normal position, as shown in Fig. 5, when pressure is removed, when a locking mechanism, hereinafter described, is released, by reason of the spring 38. The lower end of the key 32 is equipped with a metallic strip 39 which when the key is depressed sufficiently makes contact with the metallic springs 40. The number of these springs depends upon the requirements of a particular selling office as will be more fully understood when the complete construction and operation of the machine is understood. In the particular machine illustrated to explain the principle of the invention, applicant has illustrated 19 of these metallic springs 40, as best shown in Fig. 8. In addition to touching the springs 40 when depressed the strip 39 also when fully depressed touches the spring 41. Before the key 32 is depressed all of the metallic springs as 40 are entirely electrically isolated from spring 41. When a key as 32 is depressed and the strip 39 comes in contact with spring 41 then electric current may flow from the wire 42 to the binding post 43, spring 41 and strip 39 to the springs 40 and so through each of the wires connected to these springs 40.

As the flow of electric current from the springs 40 through the wires connected thereto causes the mechanism in the selector and printing mechanism box, S, to function to form a particular token it is necessary as soon or just before this flow of current is caused to not only lock the depressed key in its depressed position but also to prevent any other key in the key box from being depressed. This is accomplished by mechanism, as best shown in Figs. 4, 6 and 8. Each key as 32 is provided with a lock plate actuating projection 44. Upon the depression of a key, as 32, the lock plate actuating projection 44 contacts with the edge of a locking orifice 45 in a locking plate 46 and forces that locking plate to the right as viewed in Fig. 4, that is, if a key as 32 in the same row with the Philadelphia key as shown in Fig. 3 is depressed. The locking plate 46 extends from one side of the machine to the other, as viewed in Fig. 4, and as more particularly shown in Fig. 6. It is to be noticed, however, that as Fig. 6 is a view which has been made considering the key box revolved around 180 degrees in a horizontal plane from the position as shown by Fig. 3, if the key hereinbefore designated as the Philadelphia key and appearing in the upper right hand corner of Fig. 6 is depressed, then the locking plate 46, as shown in Fig. 6, is moved to the left. Fig. 6 also shows that the locking plate 46 coacts with two rows of keys, and that another locking plate 47 coacts with the next two rows, and a locking plate 48 with the succeeding two rows, and a locking plate 49 with the next succeeding two rows. The locking plate actuating projection 44 on those keys which coact with locking plate 47 is positioned reversely to the locking projection 44 on the keys coacting with the locking plate 46, consequently, a depression of a key, comparable with 32, connected with locking plate 47, moves locking plate 47 to the right as viewed in Fig. 6. Locking plate 48 is connected by keys positioned similarly to the Philadelphia key and so locking plate 48 is moved to the left, as viewed in Fig. 6, upon the depression of a key connected therewith. Locking plate 49 connects with its keys in the same way as locking plate 47 and in consequence is moved to the right, as viewed in Fig. 6, when a key connecting therewith is depressed. Locking plate 46 is connected at the left hand end of 46 with a pivoted, rocking lever 50 which at its other end is connected with locking plate 47. Locking plates 47 and 48 are similarly connected by rocking lever 51 and locking plates 48 and 49 are similarly connected by rocking lever 52. The free end of locking plate 46 is connected to a retracting spring 53, one end of which is attached to the side of the key box K. The free end of the locking plate 49 is connected to one end of a rocking lever 55, the other end of which coacts with unlocking and restoring mechanism to be hereinafter more fully described. The depression of a key, as 32, causes, by means of the locking projection 44, the locking plate 46 to move to the left, as viewed in Fig. 6, or to the right as viewed in Fig. 8, thus causing the locking orifice 45 to move to the right, as shown in Fig. 8, so that the edge 54 of the orifice on the opposite side of the key from the locking projection 44 enters into a cut away portion 54' of the keys, that is, into a locking cavity in each of the keys cooperating with plate 46, so that by reason of the shoulder 56 on each of these keys, as best shown in Fig. 8, none of the other keys may be operated after one key has been depressed. All keys are similarly locked so as to prevent a depression thereof, by the interconnection, as shown in Fig. 6, by means of locking levers 51 and 52 between the locking plates 46 and 47, 48 and 49. The key which was depressed and which locked all of the other keys is also itself locked in depressed position. This is shown most clearly by Fig. 8. Upon depressing a key, as 32, as shown in Fig. 8, the locking projection 44 contacts with the edge of a locking cavity in the plate 46 and moves that plate to the right, as viewed in Fig. 8, but the depression of the key 32 is such that the projection 44 passes entirely through the locking orifice 45 in the plate 46 and then the plate 46 moves to the left, as viewed in Fig. 8, or to the right as viewed in Fig. 6 by virtue of the pull by the spring 53. This action brings the edge of the locking cavity 45 in the plate 46 into contact with the upper face 57 of the locking projection 44 and so prevents even the depressed key from returning to its normal position. In order that each key may be depressed without interference from the locking plate, as 46, a clearance cut away portion 58 is formed in the edge of each key, as best shown in Fig. 8. This allows a locking plate, as 46, to move to the right, as viewed in Fig. 8, when actuated by projection 44 entering the cut away portion 58 of the key being depressed. In order to effectuate this movement properly, the projection 44 has been positioned vertical of the key 32 such that before it starts a movement of locking plate 46 the key must have been depressed an amount sufficient to bring the locking plate 46 out of alignment with the cavity 54' and into alignment with the lower portion of the clearance space 58.

There are 200 keys shown projecting from the top of the key box, as shown by Fig. 3, and each of these keys is constructed and arranged for locking each of the other keys and itself and for closing partial circuits by means of strips such as 39 and metallic springs such as 40 and 41. Each of the keys is assigned to a particular destination. Each of the keys when depressed closes those particular partial circuits necessary to be closed, as will be more fully explained hereinafter, necessary to cause a proper operation of the selecting and printing mechanism to impress the token and the tape record with the proper indicia. All of the metallic springs 41 cooperating with the strips 39 are connected together and to one side of a source of electric potential as by means of conductors 373, Fig. 27 and 42, shown in Fig. 5, and by conductor 42' as shown in Fig. 4.

Positioned in the key box but beneath the supports for the metallic springs 40 and 41 is an insulating plate 59, shown in Figs. 4 and 5. This plate acts as a support for metallic binding posts 60 which are arranged to project both above the top and the bottom of the plate, as well shown both in Figs. 4 and 5. The binding posts 60 are shown in the plan in Fig. 7. As shown, there are 38 groups, one half being on one side of the line 61 and the other half being on the other side. Each group consists of 27 binding posts, not all of which are shown in Fig. 7. The number of groups of these binding posts is determined first by the number of keys. If there are very few keys the groups above the line 61 would not be used. If there are an extremely large number of keys the key box would have to be enlarged and still further groups added above the groups as above the line 61 as shown in Fig. 7.

The groups 62 to 73 inclusive, are what I term the alphabet groups because in each of the groups there is one binding post corresponding to each letter of the alphabet. The number of these alphabet groups is determined by the number of letters in the name of that station which is a destination having the largest number of letters therein. In the particular case selected by applicant, Philadelphia, having 12 letters therein has been used to determine the number of groups shown. The groups 74 to 77 inclusive are the price groups and in each of these groups there is at least one binding post corresponding to each of the digits 1 to 9, inclusive, and zero. The number of price groups is determined by the largest amount chargeable for a token issued from the office in which the machine is placed. In the illustrated case shown in the drawings four price groups are shown, so that the maximum price which may be indicated is $99.99, that is, a price of four figures. The three groups 78 to 80, inclusive, are the code groups. Each of these groups contains a binding post corresponding to each letter of the alphabet. In the illustrated case three groups only are shown, because for purposes of illustration, applicant has elected to use as a code for each destination a three letter word.

Corresponding to each of the groups of binding posts there is in the selector and printing box, a wheel, having on its periphery the letters of the alphabet for the alphabet group and the code group and digits for the price groups. When the alphabet wheels have been properly positioned they impress upon the tokens the name of the destination station. When the price wheels have been properly positioned they impress the price of the token thereon and when the code wheels have been properly positioned they impress the code word or combination of letters upon the tape record. As these wheels are arranged side by side so as to form a given word in the same manner as printing from movable type, it is necessary in printing the name of a given destination upon a token to select the proper one of these wheels so that the initial letter of the name of the destination will be symmetrically placed upon the token and that the following letters will appear in their proper places. By reason of these requirements, when it is necessary to print or impress a given destination name upon a token it is necessary to select a binding post of a group corresponding to a proper wheel: for instance, if the word Philadelphia is to be impressed upon the token every type wheel must be used as there are only 12 alphabet wheels, furthermore, the first letter of the name must be impressed by that type wheel which will bring the letter adjacent the left hand edge of the token as viewed in Fig. 24. This type wheel is the one corresponding to the group of alphabet binding posts designated 62 in Fig. 7. The next and succeeding letters of the word Philadelphia must be impressed by those type wheels corresponding in succession to the group of alphabet binding posts designated 63 to 73 inclusive. It is then necessary in impressing the word Philadelphia upon a token to use P binding post of group 62; the H binding post of group 63; the I binding post of group 64; the L binding post of group 65; the A binding post of group 66; the D binding post of group 67; the E binding post of group 68; the L binding post of group 69; the P binding post of group 70; the H binding post of group 71; the I binding post of group 72; and the A binding post of group 73.

In order to impress upon the token the proper price, such price wheel must be selected for the first left hand digit of the price as will bring that digit in the proper place upon the token. That price wheel which impresses the digit the farthest to the left upon a token as viewed in Fig. 24 is the price wheel which is controlled by group 74 of Fig. 7, consequently, the price wheel corresponding to the group 74 will be used if the price is $10.00 or over and the proper one of the binding posts will be utilized corresponding with the particular figure desired to be impressed. The remaining digits of the price would be impressed by the adjacent price wheels the next one of which is controlled by binding post group 75, the next digit to the right is controlled by binding post group 76 and the last digit is controlled by binding post group 77. If the price to be indicated on the token were $14.50 the binding post assigned to the character 1 would be used of group 74; the binding post corresponding to character 4 of group 75; the binding post 5 of group 76; and the binding post corresponding to character 0 of group 77.

The code designation in the illustrated case consists of a three letter word. The left hand letter of the word is impressed on the tape record TR, shown in Fig. 26, by the action of the code type wheel corresponding to the group 78 of binding posts. The following letters of the code word are impressed in order by type wheels corresponding in order to the groups 79 and 80. If the code to be impressed is PHI then the P binding post of group 78; the H binding post of group 79; and the I binding post of group 80 would be used.

Having determined the particular key, as 32, in the key box K which is to be used to produce a given token and the price which is to be impressed upon that token and the code letters which are to be impressed upon the tape record when such a token is produced, then one electrical conductor, as 81 of Fig. 4, will be connected between the spring members 40 cooperating with the selected key to a proper binding post of such of the groups as correspond with such type wheels as must be brought into action; for example, the conductors from the springs 40 of the Philadelphia key would comprise one to the P binding post of group 62; one to the H binding post of group 63; one to the I binding post of group 64; one to the L binding post of group 65; one to the A binding post of group 66; one to the D binding post of group 67; one to the E binding post of group 68; one to the L binding post of group 69; one to the P binding post of group 70; one to the H binding post of group 71; one to the I binding post of group 72; and one to the A binding post of group 73. These wires or conductors would suffice to convey current from the source of potential to each of the binding posts indicated, and as each group corresponds to a separate and distinct type wheel in the selector and printing mechanism the particular type wheels desired would be controlled.

In addition to the wires above set forth there would also be one wire from springs 40 to binding posts in the price groups. In case the price was one of four figures there would be a wire to each of the groups. In the case of Philadelphia in which the price is $14.50; one wire would be connected to the 1 binding post in group 74; one to the 4 binding post in group 75; one to the 5 binding post in group 76; and one to the 0 binding post in group 77.

The impression of the code on the tape record requires: one wire from a spring 40 of the key to group 78 to the P binding post; one to the 79 group to the H binding post; and one to the 80 group to the I binding post.

In order to properly control the selector and printing mechanism to form a token giving privilege of transportation from New York to Philadelphia and form a proper tape record it will thus be necessary to use 19 wires extending from 19 separate springs cooperating with the Philadelphia key and one of these wires will be connected to a post in each of the groups 62 to 80 inclusive, that is, the projection of a Philadelphia token, its price being expressed in four letters, makes use of the full facilities of the physical embodiment illustrated in the drawings. The number of wires from the springs on a key to the groups of binding posts may be ascertained by counting the number of letters in the name of the destination, adding to that number the number of figures or digits in the price of the token, and to that total adding the number of letters in the code designation. It is to be observed, however, that the three wires going to the binding post groups for the code designation are always similarly arranged and the first letter of the code designation always is controlled by the 78 group the next letter by the 79 group and the last letter by the 80 group. In the case of the price impression on the token, the first digit of the price, that is, the digit farthest to the left is not always impressed by the type wheel corresponding to the group 74 but only in case the price is expressed by four figures. If the price is expressed by three figures then there will be only three wires from the key to the price group and the group 74 will have no binding post connecting with a wire for that particular key. The wire controlling the type wheel which forms the left hand digit of the price will be connected to a binding post in the group 75. The wire controlling the type wheel which forms the next digit to the right, that is, center digit will be connected to a binding post in group 76 and the extreme right end digit will be controlled by a wire connected to a binding post in group 77. In case the price includes two figures only, that is, less than one dollar, two wires only will be used and the wire which controls the type wheel which forms the first digit to the right of the decimal point will be connected to a binding post in the group 76 and the other wire will be connected to a binding post in the group 77. If the price of the ticket is less than ten cents two wires would be used, one to control the type wheel which forms the decimal point and the zero to the right of the decimal point, which would be connected to a binding post in the group 76 and the other wire to a binding post in the group 77.

It is to be understood that for the purpose of illustration 200 keys have been shown in Fig. 3 but, of course, this number may be anything desired. If the number is increased further groups of binding posts such as 62 to 80 may be added. If the number is made less some of these groups may be dispensed with.

It is also to be understood that the number of groups 62 to 80 inclusive, is determined by the sum total of the number of letters in the longest named destination upon the railroad to which is added one group for every digit in the highest price charged for any ticket or token and to this is added one group for each letter forming the code word. In the particular case selected for illustration there are twelve alphabet groups as Philadelphia contains 12 letters and is the station having the longest name on the assumed railway. The price section contains four groups as the highest price charged for any ticket on the assumed railway is not more than $99.99 and the code section contains three groups because a three letter code word has been selected.

If the name of the destination is a shorter word such as Sheldale as indicated by the key just above the Philadelphia key in Fig. 3 the first letter S of the name would not necessarily be impressed by that type wheel which corresponds to the group 62 of Fig. 7. It might be desired to more artistically arrange the impression upon the token and consequently the first letter of the name Sheldale, that is, the letter S might well be impressed by that type wheel which corresponds to the group 66 and the succeeding letters of the name by those type wheels corresponding in order to the group 67 to 73, inclusive. This arrangement would place the word Sheldale upon the token in a more symmetrical way, although in the embodiment shown, this arrangement has not been availed of. In the case of the word Sheldale there would be only 8 wires from the key for forming the name; three for forming the price, as the price consists of only three digits, and three for forming the code word SHE, making a total of 14, that is, there would be 14 wires extending from the springs 40 of the Sheldale key to the groups of binding posts, as shown in Fig. 7.

It is also to be understood that a particular post of a particular group of posts as 62 to 80, inclusive, may not only have a wire extending to it from the key which controls a particular station such as Philadelphia, but it may have many wires each extending from a separate key connected to it because, for instance, there may be upon the railroad many stations the name of each of which consists of 12 letters and the first letter a P. In such case there would be a wire extending from each of the keys to the binding post P of groups 62.

It is also to be understood that not only would a given binding post in a given group have connected thereto a wire as a controlling means for a type wheel for impressing a given letter on a token as part of one name but it might also have many other wires each one of which is for the purpose of causing the same type wheel to impress the same letter upon other tokens as a letter of other names: in short, each one of the binding posts in each one of the groups may have a large number of wires each one coming from a different key connected to it. This mass of wires may become so great that applicant, for mechanical reasons, adds another group of binding posts above the line 61, in line with the group below, or may add still further groups in line with a group below by making the casing of the key box sufficiently extensive. When this is done each group in a vertical line, however, in a given numbered group as 62 would each have a post assigned to a definite letter of the alphabet and each of the groups would be associated with exactly the same type wheel in the selector and printing mechanism but some of the wires for a particular letter would be connected to the binding post of that letter in one of the vertical groups and some to the binding post in another of the vertical groups and in case more than two groups were used wires corresponding to that particular letter might be connected to the binding post assigned to that particular letter in the further groups, but below the insulating plate 59 identical letters in each of the vertical groups would be connected together and one wire only extend from the key box to the selector and printing mechanism box for controlling a particular type wheel to cause it to impress that particular letter on a token. The same observation is made in regard to the alphabetical groups 62 to 73, inclusive, and may be also made with equal validity in regard to the price groups and to the code groups 78 to 80, inclusive.

The wires 83, as shown in Fig. 5, from the different binding posts for connection with the selector and printing mechanism would be bunched together and brought out of the key box K as shown in Fig. 2 and carried through the conduit 84 to the selector and printing mechanism box S to be distributed and connected as will be hereinafter more fully explained.

The binding posts as 60 are particularly constructed in such a way that a large number of wires may be connected to each. This construction is clearly shown in Fig. 10. The binding post proper 85 is fastened in any suitable manner in the insulating plate 59 and bears a jamb screw 86 at its lower end for connecting a wire thereto. For connecting the wires from the springs 40 of the keys, a slot 87 is formed in the post 85 of some considerable extent longitudinal of the post so that one or many wires may be inserted in this slot one above the other. The wires are held in the slot and in good metallic contact with the metallic post 85 by the adjustable screw 88 which is threaded through the upper end of the binding post 85.

In order to have a record for statistical purposes of the exact number of each kind of ticket or token dispensed at each office applicant has provided a counting mechanism or counter such as 89', one cooperating with each key, as shown on Figs. 3 and 5. Each of these counters, which may be of the ordinary and well known form, is provided with a projecting lever 90 which contacts with a projecting portion of the key, as the finger piece 33, and is thereby so actuated as to cause the counter therein to register one number higher. These counters are preferably positioned upon the top plate 36 of the key box K, but it is to be understood that this particular positioning does not mean or suggest that they may not be positioned below the plate or in any other desired or convenient place. If above the plate, it is very easy to read each counter and record the same upon any desired material such as a sheet of paper for use in arranging statistics.

The depression of one of the keys as 32 through a strip as 39 and a metallic contact as 40 and a wire as 81, Fig. 4, and a wire as 83, Fig. 5, completes a partial circuit through an electric motor M, the complete circuit of which is shown in Fig. 27, which will be fully traced hereinafter but for the moment it may be considered that the motor M is energized so that its armature turns. The turning of the armature of the motor M causes the shaft 89, as best shown in Fig. 12, to turn. This shaft has a worm 90 attached to the end thereof which engages with a worm wheel 91 and causes the same to turn. The worm wheel 91, as best shown in Fig. 11, revolves a shaft 92 through a slip clutch 91' so that the operation of the motor causes the shaft 92 to turn so that its near circumferential surface, as viewed in Fig. 11, moves in the direction of the arrow g.

Rigidly attached to the shaft 92, as by pin 93, shown in Fig. 11, is a cam block 94 having a cam groove 95 formed therein. This cam groove is shown in Fig. 11 and also in Fig. 12. In Fig. 12 it is most clearly seen that the cam groove has a lower portion 96 and an upper portion 97 connected by the slant portion 98 and it is to be observed that there are two slant portions corresponding to 98, one on the side of the block, as viewed in Fig. 12, and the other diametrically opposite thereto on the other side of the block.

Within the cam groove 95 is a cam pin 99. This cam pin is carried on the end of a reciprocatable slide 100 journaled in the slide support 101, shown in Fig. 11. This slide 100 at its upper end carries the clutch shifting pin 102 engaging in the circumferential groove 103 of the clutch 104. This clutch 104 is mounted upon the shaft 92 and although free to slide longitudinally of the shaft 92 is constrained to turn therewith, by reason of an engagement with a key or spline 105 seated in a key-way in the shaft 92 in a corresponding way in the clutch 104.

The first movement of the motor M causes the cam block 94 to move in the same direction as the shaft 92, that is, in the direction of the arrow g, Fig. 11, consequently, as will be seen by reference, particularly, to Fig. 12, the cam pin 99 situated on the opposite side of the cam block 94 from that viewed in Fig. 12, will upon the initial movement of the cam block 94 be moved downwardly, as viewed both in Fig. 11 and Fig. 12, so as to bring it in the lower groove 96. This lowering of the cam pin 99 causes the slide 100 and the clutch pin 102 to be lowered and so causes clutch 104 to engage with its mate 106. The mate 106 is formed integrally with or fastened to the bevel gear wheel 107 which is mounted so that it will maintain its position longitudinally of the shaft 92 but will not rotate with the shaft 92. The engagement of the clutch 104 with its mate 106 causes bevel gear wheel 107 to also rotate in the same direction as the shaft 92 and, as bevel gear wheel 107 meshes with bevel gear 108, motion is imparted to wheel 108 so that its top surface, as viewed in Fig. 11, moves in the direction of the arrow h.

Bevel gear 108 is rigidly attached to a shaft 109, journaled in 109' and 109'' and consequently upon the movement hereinbefore described the shaft 109 also moves in the direction of the arrow h.

The shaft 109 carries a multiplicity of toothed or gear wheels 110 to 132, inclusive. Each of these wheels is similarly constructed and each is mounted upon the shaft 109 so that they move with the shaft 109 unless an obstruction is interposed to prevent their movement. This is accomplished by mounting the wheels 110 to 132, inclusive, upon the shaft 109 between friction discs as 133 and 134. These friction discs 133 and 134 are arranged so that they must turn with the shaft 109 but are slidable longitudinally of the shaft 109 and are maintained in position against side faces of the wheels 110 to 132, inclusive, by the resilient spring means 135. This construction is such that the springs 135 force the friction discs 133 and 134 against the face of the wheels as 110 and 132 but if any obstruction is put in the path of any of the wheels 110 to 132, inclusive, the spring 135 gives enough so that the friction discs as 133 and 134 move far enough away from a wheel as 110 to 132, inclusive, so that that wheel may remain stationary.

The continued motion of the motor M would cause all of the toothed wheels 110 to 132, inclusive, to revolve. The near edge of the wheels, as viewed in Fig. 11, would move upwardly, that is, in the direction of the arrow h. In Fig. 13 one of the gear wheels 118 is shown and its direction of movement by the action of the motor M is indicated by the arrow i. Another one of the gear wheels, 130, is shown in Fig. 14 and its direction of movement when driven by motor M is indicated by the arrow j.

Each of the gear wheels 110 to 132, inclusive, are constructed exactly like the gear wheel 118, shown in Fig. 13, and the gear wheel 130 shown in Fig. 14. Each has a shoulder 137 which when the gear wheel is in normal initial position contacts with a stop, as 137'. The extent of movement of the gear wheels in the direction opposite to the arrows i and j is governed by the contact of a shoulder, as 138, with a projected solenoid core as 139 of Fig. 13. The solenoid core 139 when electrically actuated to move into the path of shoulder 138 causes a gear wheel, as 118, to stop when its shoulder 138 contacts with the solenoid core or plunger 139, the shaft 109 continuing to turn but the gear wheel, as 118, remaining stationary, slipping between the friction discs 133 and 134.

The solenoid core or plunger 139 is only one of many such cores or plungers which cooperate with the shoulders 138 on each of the gear wheels 110 to 132, inclusive. The solenoids which control the plungers, as 139, are arranged about the periphery of the gear wheels as 118 and on lines radiating from the center of the shaft 109. One solenoid designated 140 in Fig. 13 is supported by the arcuate members 141 and 142. Between these arcuate members are also supported, in the same vertical plane with solenoids 140, the solenoids 143 to 156, inclusive, and in a vertical plane parallel in which the solenoids 140 and 143 to 156, inclusive, are positioned but back of that plane, as viewed in Fig. 13, are situated corresponding solenoids 157 to 171, inclusive. Each of the solenoids has a plunger corresponding to plunger 139 which when the solenoid is deenergized rests below the arcuate member 141, as viewed in Fig. 13, but when the solenoid controlling plunger is energized, then the plunger projects in the manner as shown by projected plunger 139 so as to lie in the path of a shoulder 138.

The energization of the solenoids, as 140, is effectuated by wires connecting to the binding posts as 172, 173 and 174, two of which are shown in Fig. 13 but the third one of which, 174, is shown more clearly in Fig. 21. Each binding post as 172, 173 and 174 is connected to one terminal of a solenoid so that the three binding posts control three different solenoids, the common return wire from all three solenoids being connected to the binding post 175 which is in the nature of a common return, as all of the common binding posts are connected together by means of a conductor as 176, which as shown in Fig. 27 through wires 177, 178 and 179 connects to one side of the motor M.

The wires shown attached to binding posts 172, 173 and 174 in Fig. 21 are the wires which have been designated generally by numeral 83, as shown in Fig. 5, that is, without going into the circuit in detail at this time it may be said that one terminal of the electrical supply connects to binding post 43 of Fig. 5 so that the current can flow to spring 41, and when 39 connects spring 41 with springs 40 so the current can flow from the springs 40 by means of wires designated generally by 81 as shown in Figs. 4 and 5 to the binding posts 60, and from the binding post 60 by the wires designated generally as 83 to the terminals 172, 173 and 174 of the solenoids as 140 and from those solenoids by means of the binding post 175 and the common wire to and through the motor M as shown in Fig. 27.

The particular one of the wires, as 83, connected to a particular binding post as 172, 173 or 174 is determined by the extent of movement that is desired for a wheel as 110 to 132, inclusive, before being stopped, that is, just that amount of movement of gear wheels, as 110 to 132, inclusive, must be allowed before being stopped by a plunger, as 139, so that the mechanism which is actuated by gear wheels as 110 to 132 will be positioned as desired so that it may be said that each of the solenoids corresponds with a definite letter or a definite number or digit and each gear wheel as 110 to 132, inclusive, has associated with it such a number of solenoids and controlled plungers as will allow the gear wheel to be stopped at any of its positions corresponding to any letter or digit which is to be made operative for impression producing purposes by that particular gear wheel. The solenoids shown in what might be called a side view in Fig. 13 are shown in what may be called end-view in Fig. 11, that is, the bank or group of solenoids illustrated in Fig. 13 are all included between the lines 180 and 181 of Fig. 11, that is, that space is the space occupied by a group of solenoids each governing the gear wheel 118. The other groups of solenoids corresponding to the groups shown in Fig. 13 are arranged alongside of the group comprised between the lines 180 and 181 of Fig. 11 and each group controls that gear wheel positioned directly above it, as shown in Fig. 11.

Each of the gear wheels 110 to 132, inclusive, engage gear wheels as 182 to 204, inclusive. These gear wheels are all mounted for free rotation upon the shaft 205, supported in bearings, as 206 and 207. Some, as 189, 190, 191, 200 and 202 mesh directly with some one of the gear wheels as 110 to 132, inclusive and also with type wheels as 208 of Fig. 13 but the others, such, for instance, as 182 to 188, inclusive, mesh directly with the gear wheels as 110 to 116, inclusive, but are each mounted on sleeves, as 209 to 215, inclusive, and 404 to 414, inclusive. Sleeves, 209 to 215, inclusive, are of constantly increasing internal diameter, so that each sleeve of a successively higher number has a sleeve of an internal diameter just sufficient to properly fit the outside diameter of the preceeding sleeve as a bearing so that sleeve 215 turns on sleeve 214; 214 turns on 213; 213 turns on 212; 212 turns on 211; 211 turns on 210; 210 turns on 209; and 209 turns on the shaft 205.

Sleeve 215 carries the gear wheel 188 adjacent one end and the gear wheel 216 adjacent the other end and between, the gear wheel 189 journals upon the sleeve 215.

Gear wheel 187 is attached to a sleeve 214 to the other end of which is attached the gear wheel 217, and in the same manner gear wheel 186 is attached to sleeve 213 to the other end of which is attached the gear wheel 218. Gear wheels 185, 184, 183, and 182 are through their sleeves 212, 211, 210 and 209 connected, respectively, to gear wheels 219, 220, 221 and 222.

In a similar way to that above described the gear wheels 192 to 197, inclusive, are connected to gear wheels 223 to 228, inclusive.

In a similar way, gear wheel 198 connects with gear wheel 229; gear wheel 199 with gear wheel 230; gear wheel 201 with gear wheel 231; gear wheel 203 with gear wheel 232; and gear wheel 204 connects with gear wheel 233.

From the description hereinbefore given of the connection between gear wheels 110 to 132, inclusive, and 182 to 204, inclusive, and the connection of gear wheels 182 to 204, inclusive to the gear wheels 216 to 233, inclusive, it will be understood that an operation of the motor M may cause a definite angle of rotation of each of toothed wheels 189, 190, 191, 200, 202 and 216 to 233, inclusive, that is, each of these gear wheels will be rotated through a given angular amount in the direction of the arrow K of Fig. 13, thereby causing a definite rotation of type wheels as 208 in the direction of the arrow 1, so that a particular type legend or numeral or digit carried by a wheel 208 will be brought to a definite position.

There are 16 type wheels, such as 208, twelve of which are for impressing the station destination upon the token and four for impressing the price. There are twelve type wheels for impressing the station destination because on the particular road which has been considered as an example the station having the longest name is one having twelve letters therein. There are four type wheels used for impressing the price of the token thereon because in the particular case selected the highest price charged for any token on the railroad is not more than $99.99, that is, is a price which may be expressed by four digits.

The type wheels are all alike and like the wheel 208 of Fig. 13. In Fig. 23 these are designated 208 and 234 to 244, inclusive, for those wheels which are used to impress the name of destination, and 245 to 248, inclusive, for those wheels which impress the price upon the token.

Each of the wheels as 208 is mounted freely rotatable upon a sleeve 249 mounted, freely rotatable, upon a shaft 250. Each wheel has teeth, as 251, Fig. 13, engaging with the teeth of a wheel, as 190, when a wheel, as 208, has been rotated a definite amount in the direction of the arrow 1 then some one of the movable type 252 is brought directly under the token conduit 253 and over the plunger 254. Wheels as 208 and 234 to 244, inclusive, Fig. 23, will, if the Philadelphia station key is depressed, move rotatively about the sleeve 249 so that: wheel 244 will bring the letter P directly underneath the token conduit 253; 243 will bring the letter H to the same position; 242 will bring I to position; 241 will bring L to position; 240 will bring A to position; 239 will bring D to position; 238 will bring E to position; 237 will bring L to position; 208 will bring P to position; 236 will bring H to position; 253 will bring I to position and 234 will bring A to position.

The price impressing type wheels 245 to 248, inclusive, when the Philadelphia key is depressed, will be brought to such positions: that wheel 245 will bring the digit 1 directly under the token conduit 253; 246 will bring the digit 4 into position; wheel 247 will bring the digit 5 into position; and wheel 248 will bring the 0 into position.

When all of the type wheels have been positioned, a plunger, as 254, under each of the type wheels is elevated and will contact with a spring pressed positioned type plunger, as 252, and impress the word, Philadelphia and the price $14.50 upon the token T, positioned in the token conduit 253.

Connection between the motor M and the wheels 110 to 132, inclusive, is such that these wheels will be moved through an arc sufficient to sweep the shoulder 138, if unimpeded, over all of the solenoid plungers, after which the shaft 92 through bevel gear 255 rotating in the direction of the arrow m, as shown, rotates the meshing bevel gear 256 in the direction of the arrow n, as shown, thereby rotating sleeve 249 and disc 257 attached thereto in the direction of the arrow n, that is, as viewed in Fig. 12, disc 257 is rotated in the direction of the arrow o. Disc 257 carries the driving pin 258 which when disc 257 has been sufficiently rotated in the direction of the arrow o enters into one of the driving grooves 259 of a Geneva movement and causes a rotation of the gear wheel 260 upon the stub shaft 261 in the direction of the arrow p causing a rotation of pinion 264 in the direction of the arrow q. This pinion 264 is attached rigidly to the shaft 265 which, as shown in Fig. 13, has a cam 266 thereon which, when the shaft is moved, rotates in the direction of the arrow r of Fig. 13, contacts with the lower end of the plunger 254, and forces the plunger upwardly into contact with the one of the type plungers 252, which contacts an inked tape 266' and forces it into contact with token T thus making the necessary impression.

The token is, preferably, as formed a portion of a ribbon or roll of paper as wide as the distance between the upper and lower lines of Fig. 24, that is, about 1¼ inches wide. This ribbon or roll is positioned in any convenient place on a spindle of some sort and passes into the selector and printing mechanism box S at the bottom, as best shown in Fig. 2, where the ribbon is designated PR. It is also shown at the right hand side of Figure 11. It extends upwardly along the front of the case in a sort of conduit which bends slightly upwardly and to the left near the top of the case S, as shown in Fig. 11, at the upper right hand corner bringing the ribbon between the rollers 267 and 268. The roller 267 is resiliently pressed, as by a spring 269', toward the roller 268 so that if roller 268 is turned the paper ribbon will be moved forwardly in the direction of the arrow s. The roller 268, as best shown in Fig. 19, is mounted on a shaft 269 having the bevel gear 270 rigidly mounted thereon. This bevel gear 270 meshes with bevel gear 271 mounted on a shaft having on the other end thereof the bevel gear 272 meshing with the bevel gear 273. The bevel gear 273 is mounted rigidly on a shaft 274 having also rigidly mounted thereon the Geneva movement member 275. Cooperating with the member 275 is the locking surface 276 and the driving pin 277. The pin 277 and locking surface 276 are mounted rigidly with a disc 278 rigidly attached to sleeve 279 which sleeve, as best shown in Fig. 11, at the upper right hand corner, is connected rigidly with bevel gear 280 which meshes with bevel gear 255. When shaft 92 moving in the direction of the arrow g rotates bevel gear 255 in the direction of the arrow m, the bevel gear 280 is driven in the direction of the arrow t which drives the disc 278, as shown in Fig. 19, in the direction of the arrow u. When the driving pin 277 comes into engagement with one of the forks of 275 the bevel gear 273 is moved in the direction of the arrow v. Bevel gears 272 and 271 will be moved in the direction of the arrow w which will move bevel gear 270 and roller 268 in the direction of the arrow x which will move the paper ribbon PR forwardly in the direction of the arrow s. The paper will continue in the conduit and pass along, being stiff enough to be pushed along in the conduit, and passing over the inked ribbon roller 281 moves along over number wheels NW, printing plate P and date wheels DW. The paper of the roll PR, having been fed into position during the preceding cycle of the machine is impressed with the numbers set up on the number wheel, the particular type face presented by the printing plate and the particular date set up on the date wheel because these parts are all held in a frame designated generally by 282, Fig. 11, through which passes the shaft 265 having thereon a cam face 283 which when the shaft revolves contacts with a face 284 so as to bring all of the impression producing elements into contact with the inked ribbon and press the same against the paper roll so as to produce upon the section of the paper roll to later become the token between the lines 285 and 286 of Fig. 24, the indicia appearing thereon, and after the paper ribbon has been moved forwardly so as to be in position over the alphabet wheels and the price wheels of Fig. 23, to then impress the date, as shown in Fig. 24, cross-wise of the token. At the same time that the date is impressed, the cam 266, of Fig. 13, operates to impress the station designation and the price, thereby completing the token. The line of severance of the token from the paper roll being along the line 285 of Fig. 24.

As the paper roll is advanced by the roller 268 a completed token, that is, the portion of the paper roll from the left hand end up to the line 285, as shown in Fig. 24, will be projected from the token orifice TO as shown in Figs. 1 and 11 and when projected therefrom a severing knife, as best shown in Fig. 18 is raised to cut the paper along the line 285. This severing knife is operated by the cam 288 fastened to the sleeve 249 rotating on shaft 250.

The sequence of operations are such that the indicia appearing between lines 285 and 286 of Fig. 24 will be impressed on the paper roll at the time the last completed token is made. The paper roll will then be advanced and the date, station designation and price will be impressed and then the roll will be advanced projecting the completed token through the orifice TO and then the knife 287 will sever the completed token at line 285 of Fig. 24.

As the sequential number on the token is impressed by the NW wheels when raised, it is necessary to step these wheels around one digit after each elevation. This is done in an ordinary and usual manner by pawl 404 attached to a fixed non-movable portion of 282.

In order to make the tape record TR, Fig. 26, paper ribbon of the proper width, about three to four inches as illustrated in Fig. 26, in triplicate is fed from a suitable roll, as shown in Fig. 2 and passes up alongside of selector and printing mechanism S through a slot 289, as best shown in Fig. 16, into a conduit 290 across the mechanisms to and between the rollers 291 and 292. Roll 292 is spring pressed by the spring 293 and roll 291 is mounted on the shaft 294 and has on the side face thereof ratchet teeth 295, best seen in Fig. 15, for engagement with the ratchet pawl 296 on the oscillatable lever 297 pivoted on the shaft 294 and having a pin 298 in the end thereof engaging in a cam groove 299 fixed to a gear wheel 300 rotatable about the shaft 301. The gear wheel 300 meshes with the gear wheel 302 on the sleeve 249 rotatable about the shaft 250. When, as hereinbefore described, the bevel gear 256 rotates in the direction of the arrow n the gear wheel 302 will rotate in the direction of the arrow y thereby causing a rotation of the gear wheel 300 in the direction of the arrow z bringing the depression 303 of the cam 299 in engagement with the pin 298, whereupon lever 297 is moved to the left, as viewed in Fig. 15, carrying with it the pawl 296 and so the ratchet wheel 295 and roller 291 so that the roller is given a rotation in the direction of the arrow ab. A movement of the pin 298 to the bottom of the depression and back again causes a sufficient turning of roller 291 so that a sufficient amount of the tape record paper is advanced for the next impression. The tape record paper is in triplicate, the first sheet, being perfectly plain paper, the next sheet below being provided with a carbon coat on its top surface and the next sheet below that being provided with a carbon coating on its top surface. Below all is the inked ribbon 266' so that if impression producing characters are approached from below and contact with the inked ribbon an impression will be made upon the sheet just above the ribbon by reason of the ink of the ribbon; the sheet next above that will have an impression by reason of the carbon backing of the lowest sheet; and the sheet above that will have an impression by reason of the carbon backing of the middle sheet.

The two top records will be allowed to go out of a slot as 303 in the top of the selector and printing mechanism case S and one of the record ribbons will be allowed to go out through the side as at 304. The inducing means to take the separate paths after once being started being the froglike structure 305.

The inked ribbon which is originally placed upon the spool 281, suitably restrained from turning too rapidly by the common ordinary spring detent 306, passes along through the conduit in which the paper ribbon for the token passes, then over guiding rolls 307 and 308 along under the token orifice TO and then over guiding rollers 309 and 310 to take up spool 311. This take up spool 311 is journaled on an easily removable shaft 312. This shaft 312 is given a proper intermittent motion by utilizing a worm wheel 313 on the end thereof meshing with a worm 314 on the end of shaft 315, all as best shown in Fig. 17. As shown by Fig. 19, the shaft 315 connects by the means of the bevel gear 316 through another bevel gear 317 to the shaft 269 so that when shaft 269 is given a movement the take up drum 311 is also given a movement in the direction of the arrow ac of Fig. 17.

Simultaneously with the positioning of the type or alphabet wheels AW and the price wheels PW the price total wheels PT, Fig. 25, the station designation wheels SD and the sequential number wheels SN are all properly advanced so that the sequential number, the code or station designation and the price total may be impressed upon the tape record paper so as to appear as is shown in Fig. 26.

The code designation or station designation type wheels are controlled by the gear wheels 126, 127 and 128 through the gear wheels 200, 229 and 230. Gear wheel 200 engages with type wheel 318; gear wheel 229 with type wheel 319 and gear wheel 230 with type wheel 320. These type wheels are formed in exactly the same manner as the type wheel 208 as shown in Fig. 13 and the movable type thereon are exactly the same as the movable type, as 252 on wheel 208 and they are operated in exactly the same manner as the type plungers 252 by means of movable plungers such as 254 actuated by cams as 266 upon a shaft as 265 which shaft 265 passes through the wheels 318, 319 and 320 just as it passes through type wheels such as 208. In all cases the type wheels have such a number of spokes and the spokes are so positioned that a type wheel may move through its largest arc of rotation without being interfered with by the shaft 265. The station designation wheels SD will impress the code word as shown in Fig. 26. The letter P will be impressed by the wheel 320, the letter H by the wheel 319 and the letter I by the wheel 318.

The sequential number wheels SN may be of any of the usual or ordinary forms and consist of a suitable number of number wheels having the digits 1 to 9 and 0 thereon and being movable in any well known and ordinary way such that after one impression is made a retraction of the wheels from the impression producing position causes a new sequential number one larger than the last to be set up by the wheels. Applicant has shown the sequential number type wheels actuated by the cam 339 on the shaft 265. The cam 339 being on the shaft 265 driven by the Geneva movement member 263, as shown in Fig. 12, has a high spot thereon so that the high spot operates upon the members 322 upon the actuation of the member 263 by the pin 258, as shown in Fig. 12, as pinion 264 rotates once for a quarter revolution of 260, best shown in Fig. 12.

The price total wheels PT are operated from gear wheels 129 to 132, inclusive. These gear wheels mesh with gear wheels 201, 202, 203 and 204 and thereby revolve gear wheels 202, 231, 232 and 233, all as best shown in Fig. 11.

The gear wheels 202 and 231 to 233, inclusive, mesh, as shown in Fig. 14, with sector gear wheels as 323. Wheel 202 engages with a wheel 323; wheel 231 engages with a sector wheel 324; wheel 233 engages with a sector wheel 325; and wheel 232 engages with sector wheel 326.

Each of the sector wheels as 324 is formed as shown in Fig. 14, that is, it has teeth on its outer periphery engaging with the teeth of a gear wheel, as 231, and has an arm as 327 pivoted, as at 328, thereto and extending beyond the pivot 328 to form another outstanding arm 329. The arms 327 and 329 are spring pressed in their normal position, as shown in Fig. 14, by springs as 330. The initial position of the sector wheels 323 to 326, inclusive, on the shaft 249 upon which they are mounted is such that the projecting arms, as 327, move into operative position successively, that is, the toothed arm 331 of sector wheel 326 has its end 332 moved into engagement with the teeth of a wheel, as 333, and complete its operation before the toothed arm 334 of the next sector 325 comes into engagement with the teeth of a wheel, as 333, and the arm 334 completes its operation upon a toothed wheel, as 333, before a toothed arm as 335 of sector 323 comes into contact with the teeth of a wheel as 333. The toothed arm 335 completes its operations upon a toothed wheel as 333 before the toothed arm 327 of sector 324 comes into contact with the teeth of a wheel as 333.

The several toothed arms 327, 331, 334 and 335 drive totaling mechanisms of well known and thoroughly understood form diagrammatically illustrated in the drawings in Figs. 14, 11 and 25. With four sector wheels a change may be made in the total of an amount not greater than $99.99. The toothed arm 331 has nine teeth therein and advances toothed wheels, as 333, one tooth for every cent in the price of a ticket, that is, it is the cents recorder. Arm 334 has nine operative teeth therein and operates upon a toothed wheel similar to 333 to accumulate the tens of cents or dimes in the price of a ticket. The toothed arm 335 has nine teeth therein which operate upon a toothed wheel similar to 333 to record and accumulate the number of dollars in the price of a ticket up to nine dollars. Arm 327 having nine teeth therein operates upon a wheel similar to 333 to record the number of tens of dollars up to nine tens of dollars. It is well understood how the rotations caused by the cents are recorded and when totaling over nine cents then by means of a supplementary wheel, as 336, the tens of cents or dimes wheel is advanced one tooth; and how when the dimes wheel has been advanced nine teeth the next tooth advanced causes a supplementary wheel, such as 336, to turn so as to register one turn on the dollar wheel; and how that in turn when nine dollars have been registered then through a supplementary wheel, such as 336, turns one tooth on the tens of dollars wheel, and so on, so that the actual grand total which may be registered depends merely upon the number of the final type wheels used. In the particular case used as illustration nine wheels have been shown in Fig. 25, so that a total may be shown upon the tape record, Fig. 26, of $9,999,999.99.

After the price of the ticket about to be dispensed has been accumulated into the price total wheels PT of Fig. 25 by the sector wheels as 324 the impression is made upon the tape record by means of cams, as 404', upon the shaft 265 cooperating with the shoulders as 338 bodily lifting the price total type wheels up into contact with the inked ribbon 266' so as to make an impression upon the triplicate sheet forming the tape record TR.

While the impression is being made upon the paper ribbon forming the tape record the shaft 265 turns cam members, as 405' into contact with the members as 340, 341, 342 and 329, as shown in Fig. 14, moving each of these to the position of 340 as shown in Fig. 16. This position of the members, as 340, causes a pivoting of the member on a pivot such as 328, as shown in Fig. 14, and the toothed arm connected therewith is brought into such position that it disengages the teeth of the wheels, as 333, as shown in Fig. 16, and at the same time the spring pressed pawl such as 343 moves into position to hold the toothed arm, such as 331, in the moved position disengaged from the toothed wheel, as 333. As each of the members, as 340, 341, 342 and 329 are similarly acted upon by a cam, as 405', each of the toothed arms as 331, 334, 335 and 327 are released or moved out of engagement with the teeth of wheels as 333 so that upon a backward movement of sector wheels as 324, that is, in a movement opposite to the direction of the arrow ad of Fig. 14, all of the sectors may be returned to their initial position, as shown in Fig. 14, without turning backwardly toothed wheels, as 333, that is, without destroying the price total which has been set up.

As toothed arm, as 331, falls backwardly to initial position as shown in Fig. 14, at the end of its movement, as best shown in Fig. 14, the pawl such as 343, 344, 345 and 346 which were impelled into locking position by springs as 347 are restored to initial position by an abutment, as 348, which contacts with the outer end of each pawl, such as 346, and moves the other end of the pawl out of locking engagement with a toothed arm, as 327.

The record having been made on the tape record TR it becomes visible by reason of its issuance through slots in the casing of the selector and printing mechanism box. One copy issues through a slot in the side as at 304, Fig. 15, and remains as a permanent record which may be inspected by the traveling auditor on his periodical visits. Two copies issue from a slot, as at 303, in the top, Fig. 15. These are torn off and one is retained by the ticket or token seller and the other is forwarded to the accounting office, each day, together with the appropriate amount of receipts for the day.

During all of the movements hereinbefore described the shaft 92 has been revolving in the direction of the arrow g of Fig. 11. When all of the movements hereinbefore described have taken place the shaft 92 carrying with it the cam block 94 has moved to such position that pin 99 has just entered the inclined portion 98 whereupon the pin 99 is raised and slide 100 is raised together with pin 102 which moves toothed clutch 351 into engagement with toothed gear 352. This toothed gear 352 is loose upon shaft 92 but is caused to revolve when clutch 351 meshes with gear 352. It revolves in the same direction as the shaft 92 and carries with it the bevel gear 353 meshing with 108 which now revolves in a direction opposite to that of the arrow h and returns all of the gear wheels 110 to 132, inclusive, to their initial position with their shoulders as 137, Fig. 13 and Fig. 14, to their initial position in contact with the stops as 137'. This backward motion also returns all of the gear wheels 182 to 204, inclusive to their initial position and these in turn return all of the type wheels and numeral wheels to their initial position.

The rotation of the shaft 92 to cause the return of the parts, as shown in Fig. 11, to their initial position also causes the pin 354 of a Geneva movement, as shown in Fig. 22, rotating in the direction of the arrow ad to contact with the surface of slot 355 and cause a rotation of the same about shaft 92 carrying with it the helical gear 356 which meshing with helical pinion 357 rotates the flexible shaft 358 in the casing 359. This flexible shaft 358 runs along in the casing 359, as shown in Fig. 11, passes out through orifice 360 in the selector and printing mechanism casing S and, as shown in Fig. 1, enters into the key box K where it, as shown in Fig. 6, and Fig. 9, rotates a small gear 359', shown attached to the end of the shaft. This gear wheel 359' engages with the crown wheel 359'' and turns this crown wheel in the direction of the arrow ae as shown in Fig. 9. Small protuberances as 361 are on the outer periphery of the crown wheel 360 and when they are moved in the direction of the arrow ae they contact with the small projection 362 on the end of lever 55 so as to move that lever in the direction of the arrow af of Fig. 9, or arrow ag of Fig. 6, with the result that locking plate 49 is moved to the right as shown in Fig. 6, that is, in the direction of the arrow f as shown in Fig. 8, so that the projection 44 of the key 32 is impelled by the spring 38 moves up into the orifice 45 although the key does not at this time return fully to its initial position because after 44 has moved into the orifice 45, then the spring 53 moves all of the plates in a direction opposite to the arrow f, of Fig. 8, allowing a key as 32 to return to its initial position and unlocking all of the other keys so that any one may thereafter be depressed.

As the date upon which each token is dispensed must appear on the token applicant has made provision for changing the date by a simple manipulation. The date wheels DW, as shown in Fig. 23, are carried upon shafts concentrically arranged, as shown in Fig. 28. These shafts have at the end knurled finger pieces 363, 364, 365 and 366. By turning the appropriate one of these knurled finger pieces the various wheels showing the month, day and year may be turned so as to bring the proper type into printing position. As the shaft 265 carries a cam which moves all of the wheels bodily upwardly at times the fit between the outside hollow shaft bearing finger piece 366 and the side of the casing S is made loose enough so that the necessary motion is permitted. These finger pieces for manipulating the date protrude, as shown in Fig. 1, from the right hand side of the case S in a position convenient for the ticket dispenser.

In Fig. 27 the wiring diagram is shown for the two keys for Philadelphia and Sheldale. The wires individual to these two keys are distinguished by showing the Sheldale wires in dash lines and the Philadelphia wires in full line.

A source of current is indicated at 370 and connects by means of the wire 372 with ground and by a wire 373 to a binding post, as 43, as shown in Fig. 4 and Fig. 5. When a key is depressed this current, flows out through the various wires as hereinbefore described. The rectangles 62, to 80, inclusive, represent the binding post groups 62 to 80, inclusive, of Fig. 7, the line 61 corresponding to the line 61 of Fig. 7.

It will be seen from an inspection of Fig. 27 that a full line from the Philadelphia key representing a wire runs to the P post of 62, the H post of 63, the I post of 64, the L post of 65, the A post of 66, the D post of 67, the E post of 68, the L post of 69, the P post of 70, the H post of 71, the I post of 72 and the A post of 73 and in addition a full line representing a wire runs from the Philadelphia key to the digit 1 post of 74, the digit 4 post of 75, the digit 5 post of 76 and the digit O post of 77. In addition, full lines representing wires run from the Philadelphia key for code purposes to the P post of 78, the H post of 79 and the I post of 80.

The banks of solenoids 374 to 396, inclusive of Fig. 11 are represented by the rectangles in the lower left hand corner of Fig. 27 and designated by the same numbers 374 to 396, inclusive, but they have been arranged in reverse order to prevent too many crosses of wires, that is, in Fig. 11 solenoid 374 is at the right whereas in Fig. 27 solenoid 374 is at the left. In Fig. 27 a full line wire connects with the P post of post group 62 to the P solenoid of the solenoid bank 383. This wire has been designated 397. Bank 383 has been selected as control for the initial letter P of the word Philadelphia because this solenoid bank 383, as will be seen by reference to Fig. 11, controls gear wheel 119 which in turn controls gear wheel 191 which in turn controls type wheel 244 as shown in Fig. 23, which is the type wheel used to impress upon the token the first letter P of the word Philadelphia.

In the same way that the P post of post bank 62 is connected with solenoid bank 383 so is post bank 63 connected with solenoid bank 384; post bank 64 with solenoid bank 385; post bank 65 with solenoid bank 386; post bank 66 with solenoid bank 387; post bank 67 with solenoid bank 388; post bank 68 with solenoid bank 389; post bank 69 with solenoid bank 374; post bank 70 with solenoid bank 382; post bank 71 with solenoid bank 375; post bank 72 with solenoid bank 376; and post bank 73 with solenoid bank 377.

In making the above noted connections it will be seen that the initial letter P of the word Philadelphia is selected in bank 383 as that bank controls the type wheel 244 as hereinbefore pointed out, and for a like reason the second L in the word Philadelphia is selected from solenoid bank 374 as that bank controls type wheel 237, as shown in Fig. 23, and for a similar reason the second P in Philadelphia is selected from solenoid bank 382 as that bank controls type wheel 208, as shown in Fig. 23, through gear wheel 190 and gear wheel 118, as shown in Fig. 11.

It will be seen from the foregoing description that the control wires such as 397 shown in full line in Fig. 27 connect from a definite letter post of a binding post bank such as 62 to a definite letter of a solenoid bank such as 383 which solenoid bank is in such position, as shown in Fig. 11, that it is operative to control that particular type wheel, as 244 of Fig. 23, which when rotated to the proper position will impress the desired letter at the proper position upon the token, as for instance, the initial letter of the word Philadelphia, as shown in Fig. 24. These facts necessitate a somewhat uneven arrangement, at times, of the wiring, that is, the control wires from the key banks are not necessarily connected in rotation in the same order in the solenoid banks but are connected in such position that the desired result insofar as controlling a particular type wheel is concerned as will give the desired result, that is, the printing of a particular station designation upon the token.

For printing the price upon the token, taking the case of Philadelphia as an example, a full line wire connects from post bank 74 from the digit 1 post to solenoid bank 378; a full line wire from digit post 4 of post bank 75 to the solenoid bank 379; another full line wire from the digit post 5 of post bank 76 to the solenoid bank 380; and a wire from post bank 77 to solenoid bank 381. By connecting the control wires for the price indication as just above described the digit wheel 245 of Fig. 23 will be moved so as to impress the digit 1 upon the token; wheel 246 will be moved so as to impress the digit 4; wheel 247 will be moved so as to impress the digit 5; and wheel 248 will be moved so as to impress the O.

In order to impress the station code upon the tape record, taking the station Philadelphia as an example, a control wire is connected from the P post of post bank 78 to solenoid bank 391; a control wire is connected from the H post of post bank 79 to solenoid bank 390; and a control wire is connected between the I post of post bank 80 to the solenoid bank 392. These control wires are connected in the manner described because type wheel 320, as shown in Fig. 25, is used for impressing the initial letter P of the code designation and this type wheel is controlled as will be seen by inspection of Fig. 11, by solenoid bank 391. In the same way type wheel 319 is controlled by solenoid bank 390, and type wheel 318 is controlled by solenoid bank 392.

In order to properly rotate the type wheels of the price total, branch wires are extended from the control wires which extend to solenoid banks 378, 379, 380 and 381. These branch wires are so connected that the control wire for digit 1 is connected to solenoid bank 393; the branch from the digit 4 control wire extends to solenoid bank 394; the branch from the digit 5 control wire extends to solenoid bank 396; but no branch from the zero control wire extends to solenoid bank 395 because unnecessary. In this way the control wire governing the digit representing tens of dollars is connected to solenoid bank 393 which controls gear wheel 129 which in turn engages gear wheel 201 connected to gear wheel 231. Gear wheel 231 governs the sector 324 which engages a wheel as 333, which totals tens of dollars in the price total. In the same way the control wire governing the dollars from one to nine, inclusive, is connected with solenoid bank 394 which governs gear wheel 130 which meshes with wheel 202 which in turn controls sector 323 which totals the dollars from one to nine, inclusive, in the price total. In the same way the control wire governing tens of cents is connected with solenoid bank 396 which governs the proper sector, 325, which totals tens of cents in the price total. The control wire governing one to nine cents, inclusive, is connected to solenoid bank 395 which governs sector 326 which totals cents from one to nine, inclusive, in the price total.

In the same way that the connections are made from a particular key, as the Philadelphia key, so are the connections made from any other key such as the Sheldale key. The connections for Sheldale key are shown in Fig. 27 in dash lines and the particular letter posts in the post bank and in the solenoid bank are indicated by letters shown dotted or dashed.

The electrical energy which is furnished by 370 passes through wire 373, as shown in Fig. 27, thence to a wire as 42 and binding post 43, as shown in Fig. 5, and so to the conducting member 41 and when a key, as 33, is depressed it passes to the spring contacts, as 40, thence to the control wires such as 81, as shown in Fig. 5, to the posts, as 60, as shown in Fig. 5. From the posts 60 the current passes by means of control wires designated as a whole by 83, as shown in Fig. 5, of which the individual wire 397 as shown in Fig. 27, is typical to the solenoid banks as 374 to 396, inclusive, as shown in Fig. 27. At the solenoid banks the control wire is connected to a solenoid terminal corresponding in its position in the bank with a position such that upon a rotary movement of a gear wheel, as 119, as shown in Fig. 11, that gear wheel will be stopped in a position such that the type wheel, such as 244, as shown in Fig. 23, governed thereby will be rotated to such position that a letter corresponding to the letter of the solenoid will be moved to a position so that it may be impressed upon the token. The current after traveling through the particular solenoid then connects with the common wire 176, as shown in Fig. 21, and as shown at the lower left hand corner of Fig. 27, and thence by wire 179 to the motor M then the wire 398 and then to the solenoid 399 and by wire 400 to ground 401 and so back to the source 370 by wire 372.

The current flowing in the control wires and through the apparatus with which the control wires are connected causes the motor M to revolve, and as hereinbefore described, causes the motion of shaft 92 and all of the associated parts as hereinbefore described. It is to be observed, however, that no motion whatsoever of shaft 92 can take place until current flows through solenoid 399 because solenoid 399 governs plunger 402, shown in Fig. 12, and also in cross-section in Fig. 11. This plunger 402 with the solenoid deenergized rests against a projection 403 of the cam block 94 and so prevents this cam block from turning. When a key, such as the Philadelphia key, is depressed, the current not only flows through the solenoids of the solenoid banks 374 to 396, inclusive and through motor M but also flows through the solenoid 399 causing the plunger 402 to be withdrawn so that an operation of the motor may rotate the shaft 92. When all of the movements hereinbefore described have been completed and the depressed key is caused automatically to return to normal position the circuit through the motor is broken and at the same time the circuit is broken through solenoid 399 so that the plunger 402 is projected in any well known manner, as by gravity or a spring into the path of projection 403 on the cam block 94 preventing any overrunning of the cam block 94 and so overrunning of shaft 92 and its operated parts.

Figure 29 illustrating one complete cycle of operation of applicant's device shows that the shaft 92 makes one complete rotation. During the first 90 degrees of movement, that is, that movement illustrated by the upper right hand quadrant of the figure, all type wheels are set for printing and the sector gears operate the totaling mechanism or tabulating wheels. During the next 90 degrees of movement of shaft 92 the token is printed; the tabulating sheet is printed and the sector gears are released from the totaling or tabulating wheels and during this 90 degrees of movement of the shaft 92, the shaft 265 makes one complete revolution. During the third 90 degrees of movement of the shaft 92 the tape record or tabulating record sheets are fed forward one space and all type wheels and sector wheels are returned to normal position. During part of the third 90 degrees of movement of the shaft 92 and part of the fourth 90 degrees of movement the printed ticket or token is fed through the opening TO and the inked tape or ribbon 266' is moved. During the fourth or last 90 degrees of movement of the shaft 92 the printed ticket is severed and the keys in the key box are released and all parts returned to normal position.

Although I have particularly described the principle and one particular physical embodiment of my invention and explained my method, nevertheless, I desire to have it understood that the particular form selected is illustrative only and does not exhaust the possible physical embodiments of means underlying my invention and that the method may be practised by devices other than that shown and illustrated.

What I claim as new and desire to secure by Letters Patent of the United States, is:

1. In a device of the character described, in combination: a plurality of manually operable members; a source of electromotive force; metallic members, one positioned upon the operation of each manually operable member to connect with one side of the source of electromotive force; a plurality of electrical conductors for each manually operable member, one for each character in a name and price to be impressed upon a token also connected with the metallic member when a manually operable member is operated; means including electrical devices in circuit with the conductors and the other side of the source of electromotive force for impressing the character corresponding to each conductor upon a material to form a token corresponding to the member operated.

2. In a token making device, in combination: manually operable members; impression producing devices; selector mechanism; motive power means operatively associated with the impression devices and the selector mechanism; means including electrical conductors connecting the impression devices, the selector mechanism, and the manually operable members whereby an operation of a manually operable member will selectively operate the selector mechanism, the selector mechanism will selectively operate the impression producing devices and the impression producing devices will produce a particular distinctive impression on a section of a token material; and means for severing and projecting the token.

3. In a device of the character described, in combination: a plurality of manually operable keys; a plurality of groups of binding posts, each binding post of each group corresponding to a predetermined character; a plurality of groups of electrically controlled limiting devices; a plurality of revolvable members, one associated with each group; a plurality of revolvable character carrying members, one associated with each first mentioned revolvable members; means for transmitting motion from the first mentioned revolvable members to the character carrying revolvable members and so positioning them that a particular character is particularly positioned; an electric motor for actuating the first mentioned revolvable members; means including a source of electromotive force and partial circuits including the motor, the electrically controlled limiting devices and the binding posts closed by the operation of a manually operable key whereby the motor is caused to operate, the first mentioned revolvable members are caused to revolve until limited by the electrically controlled limiting devices, and the character carrying revolvable members are positioned for making an impression upon a token strip; means for causing the character carrying revolvable members when positioned to make an impression upon a token strip and means for completing the remaining desired impression upon said strip and advancing and severing said strip.

4. In a device of the character described, in combination: means for advancing a single token strip; means for forming consecutive numbers at predetermined distances apart upon said token strip; means for impressing identical indicia upon said token strip each time it is advanced; means for impressing a desired date upon said token strip each time it is advanced; means for impressing a different particular distinctive indicia upon different sections of said token strip; means for severing a completed section of said token strip; a plurality of manually depressible keys; and means put into operation by the depression, solely, of any one of the said keys for causing all of the first named means to operate to produce a complete token bearing indicia distinctive of the particular manually operable key which was operated.

5. In a device of the character described, in combination: a plurality of alphabet wheels; a plurality of price wheels; a plurality of number wheels; a plurality of date wheels; a printing plate; a plurality of manually operable keys, each key corresponding to a destination and each destination corresponding to a different price; means for advancing a token strip by predetermined sections, first in position to be impressed by the printing plate and the sequential number wheels and then to be impressed upon a movement ahead equal to the distance of one section by the date wheels, price wheels and the alphabet wheels; means put into operation by the manual operation of a key to position the alphabet wheels and the price wheels so that they are in position to impress upon a section of the token strip the destination and price distinctive of the key operated; means simultaneously operated by the operation of the manually operable key for causing the most advanced section of the token material to be impressed with a date and a destination name and price distinctive of the manually operable key operated and the next succeeding section of the token strip to be impressed by the printing plate and the sequential number wheels.

6. In a device of the character described, in combination: a plurality of revolvable alphabet wheels, each wheel bearing a plurality of characters; a plurality of manually operable keys; means for individually positioning desired ones of the alphabet wheels controlled by each of the manually operable keys, said means including a plurality of groups of binding posts, each of the groups cooperating with one only of the alphabet wheels and each group including binding posts each of which corresponds to a predetermined one of the characters carried by the alphabet wheel with which the group is cooperatively related; electrical conductors associated with each key and connected to the several binding posts of the several groups in accordance with the predetermined positioning of the alphabet wheels desired upon the operation of each of the several keys.

7. In a device of the character described, in combination: a plurality of characters impressing members each adapted to be positioned in a plurality of positions so as to conjointly be adapted to impress a predetermined sequence of characters upon a token strip; means for positioning each of said alphabet wheels said means including a plurality of groups of electrically controlled positioning devices, each of the electrically positioning devices in each of the groups so placed that it serves to position one of the alphabet wheels in a position wherein it is adapted to impress a predetermined character upon a token strip; manually operable keys for controlling the electrically controlled positioning devices and means actuated by an operation of a key including electrical conductors extending between each key and each electrically controlled positioning device, said conductors being intermediately grouped at a point between the key and the electrically actuated positioning device by bringing together all of those conductors from all of the keys corresponding to a predetermined character on a particular alphabet wheel, and connecting the group by one conductor to a particular one of the electrically controlled positioning devices.

8. In a device of the character described, in combination: a single token strip, a plurality of manually depressible members; means selectively controlled by a depression, solely, of one of the members whereby differing distinctive tokens are produced from said single token strip in accordance with the member depressed; and means furnishing motive power for actuation of the selectively controlled means.

9. In a device of the class described, in combination: a plurality of revolvable character carrying members; means for positioning the character carrying members individually, said means including a source of electromotive force, a motor and electrically controlled positioning devices in a partial electric circuit; a manually operable key and a normally open circuit controller included in said partial circuit and adapted to be closed by an operation of the manually operable key and when closed to close the partial circuit.

10. In a device for producing a token from a strip of token material, in combination: a plurality of manually operable keys each corresponding to a token having different indicia thereon in parts; a circuit controller associated with each key and operated to closed position upon the operation of the key; a plurality of partial circuits associated with each circuit controller and closed when the circuit controller is operated, each partial circuit corresponding to one character of the distinctive indicia on a token corresponding to a key; a plurality of groups of position limiting electrically actuated devices, each member of a group corresponding to a particular character of a token and the position on the token of the character, each position limiting device for a particular character in a particular position on a token being governed by all of the partial circuits from all of the keys corresponding to a token having distinctive indicia on a token including a character in position corresponding to the one to which the electrically controlled limiting device corresponds; a source of electromotive force and a motor included in each of the partial circuits; revolvable character carrying members, one for each of the groups of electrically actuated limiting positioning devices; means actuated by the motor for moving the character carrying members to the limiting position controlled by the electrically actuated limiting positioning devices whereby upon the operation of a manually operable key the motor is actuated to bring the character carrying members to the predetermined positions; and means actuated by the motor for causing the character carrying members to make an impression upon the strip of token material.

11. In a token producing device, in combination: a plurality of manually operable keys each corresponding to a predetermined destination and price; means for producing a complete token corresponding to any key by a single manipulation of that key; means simultaneously set into operation for producing a permanent identifying record of the token produced; means operated by an operation of one key preventing the operation of any other key and means set into operation by the operation of one key for returning the operated key to initial position and releasing all of the other keys after the completion of the token and the record.

12. In a token producing device, in combination: a plurality of manually depressible keys, each key corresponding to a different predetermined destination and price; means including a plurality of alphabetical type carriers, individually controlled to be set into operation by a depression of a key for producing a complete token bearing distinctive indicia corresponding to the manually operated key which is operated; means for producing a date upon the token; and means for manually adjusting the dating means so that it will produce any desired date.

13. In a token producing machine, in combination: a single strip of token making material; a plurality of manually depressible keys, each corresponding to a different particular destination and price; means set into operation by a depression of each of the keys for predeterminately advancing the single strip of token making material.

14. In a token producing machine, in combination: a single strip of token making material; a plurality of manually depressible keys, each corresponding to a different particular destination and price; means set into operation by a depression of each of the keys for predeterminately advancing the single strip of token making material; and means severing a predetermined section of the token making material after it has been advanced predeterminately.

15. In a token producing device, in combination: a motor; a rotatable shaft; a plurality of members mounted upon the shaft and frictionally engaging the shaft; means for causing the shaft to revolve by an operation of the motor; means for limiting predeterminately each of the members mounted on the shaft; and character wheels, one positioned by each of the members.

16. In a token producing device, in combination: a plurality of groups of position limiting devices, each group containing a plurality of electrically actuated position limiting devices; a plurality of character carrying members adapted for rotation, one corresponding to each group, limited in movement by the position limiting devices; a plurality of manually operable keys; means governed by the keys for selecting the particular positioning devices to be actuated; and means for causing the positioned character members to make an impression upon token material.

17. In a token producing device, in combination: a revolvable member formed with a substantially circular periphery described about its axis of revolution; a projecting shoulder extending outwardly from its periphery; a group of solenoids each including a core arranged with their inner ends adjacent the periphery of the revolvable member and substantially in the arc of a circle struck from the longitudinal axis of rotation of the revolvable member; means to selectively energize the solenoids and project a core into the path of the shoulder on the revolvable member whereby the extent of revolution of the revolvable member may be predetermined; and means actuated by the revolvable member for producing distinctive indicia upon token material.

18. In a token producing device, in combination: a motor; a shaft adapted to be rotated by the motor; a cam carried by the shaft; another shaft; reversing gearing connected between the first shaft and the second shaft and means operated by the cam for shifting said gearing so that the second mentioned shaft will at times move in one direction and at other times in an opposite direction and character carrying revolvable members revolved by said second mentioned shaft either in one direction or the opposite direction; and means limiting the revolution of said revolvable character carrying members in one direction absolutely and in the other direction selectively.

19. In a token producing device, in combination: a plurality of electrically actuated position limiting devices; a plurality of character carrying members adapted for rotation, each limited in movement by a positioning limiting device; a plurality of manually operable keys; means governed by the keys for selecting the particular positioning device to be actuated; means for causing the character carrying members to rotate until stopped by the position limiting devices; and means for causing the positioned character members to make an impression upon token material.

20. In a token producing device, in combination: a revolvable member formed with a substantially circular periphery described about its axis of rotation; shoulder means formed on the revolvable member and revolvable therewith; stationary positioning means, including a solenoid adapted to cooperate with the shoulder means and limit the revolution of the revolvable member; means including a manually operable key for energizing the solenoid for positioning the revolvable member; impression producing means positioned by the revolvable member; and means for utilizing the impression producing means.

21. In a device of the character described, in combination: a plurality of manually operable members; a source of electro-motive force; an electric motor; a plurality of revolvable character carrying members, each character carrying member carrying a plurality of characters; means operated by said motor for revolving said character carrying members; means for limiting the movement of the last mentioned means, including partial circuits individual to each character on each character carrying member; and means associated with each key whereby any partial circuit may be closed by any manually operable key; and means impressed by said character carrying members.

22. In a device of the character described, in combination: a plurality of manually operable members; a source of electromotive force; metallic members, one positioned upon the operation of each manually operable member to connect with one side of the source of electromotive force; a plurality of electrical conductors for each manually operable member, one for each character in a distinctive indicia to be impressed upon a token also connected with the metallic member when a manually operable member is operated; means including electrical devices in circuit with the conductors and the other side of the source of electromotive force for impressing the character corresponding to each conductor upon a material to form a token corresponding to the member operated.

23. In a device of the character described, in combination: a plurality of positionable devices, each device adapted to be placed in a plurality of positions; a plurality of manually operable keys; means for individually positioning desired ones of the positionable devices controlled by each of the manually operable keys, said means including a plurality of groups of binding posts, each of the groups cooperating with one only of the positionable devices and each group including binding posts each of which corresponds to a predetermined positioning of that positionable device with which the group is cooperatively related; electrical conductors associated with each key and connected to the several binding posts of the several groups in accordance with the predetermined positioning of the positionable devices desired upon the operation of each of the several keys.

24. A mechanism for recording in response to a single initiating operation a complete symbol comprising a plurality of characters, including in combination a recording device having a plurality of groups of recording elements, each group including similar characters similarly arranged, for recording a series of characters forming component parts of a complete symbol, electrical means for effecting selective control of the recording device to select recording elements from a plurality of said groups to record a complete symbol and a single control element for said electrical means.

25. A mechanism for recording in response to a single initiating operation a complete symbol comprising a plurality of characters, including in combination a recording device having a plurality of groups of recording elements, each group including similar characters similarly arranged for recording a series of characters forming component parts of a complete symbol, an electrical selecting device associated with each group of recording elements to select the several elements thereof for recording, a control circuit for each electrical selecting device and a single control element for controlling a plurality of said control circuits to effect selection of recording elements from a plurality of said groups to cause recording of a complete symbol.

26. A key operated mechanism for recording in response to operation of a single key a complete symbol comprising a plurality of characters, including in combination a keyboard with a plurality of keys each corresponding to a complete symbol, a recording device having a plurality of groups of recording elements for recording a series of characters forming component parts of a complete symbol, electrical means for effecting selective control of the recording device to select recording elements from a plurality of said groups to form a complete symbol and circuit connections between said electrical means and said keys to cause each key to select the recording elements corresponding to the symbol represented by such key.

27. A printing mechanism for recording in response to a single initiating operation a complete word, including in combination an impression device having a plurality of groups of type, the type of each group corresponding to the letters of the alphabet, and containing substantially the letters of the alphabet, electrical means for effecting selective control of the printing device to select type from a plurality of said groups to form a complete word and a single control element for said electrical means.

28. A printing mechanism for printing a complete word in response to a single initiating operation, including in combination an impression device having a plurality of groups of type, the type in each group corresponding to the letters of the alphabet, and containing substantially all the letters of the alphabet, an electrical selecting device associated with each group of type to select the several type thereof for printing, a control circuit for each electrical selecting device, and a single control element for controlling a plurality of said control circuits to effect selection of type from a plurality of said groups to cause printing of a complete word.

29. A key operated printing mechanism for printing a complete word in response to operation of a single key, including in combination a keyboard with a plurality of keys, each corresponding to a complete word, an impression device having a plurality of groups of type, the type of each group corresponding to the letters of the alphabet, electrical means for effecting selective control of the impression device to select type from a plurality of said groups to form a complete word, and circuit connections between said electrical means and said keys to cause each key to select the type corresponding to the word represented by such key.

30. A mechanism for recording in response to a single initiating operation a complete symbol comprising a plurality of characters, including in combination a recording device having a plurality of recording elements, each for selectively recording any one of similar sets of characters, for recording a series of characters forming component parts of a complete symbol, electrical means for effecting selective control of the recording device to record a complete symbol and a single control element for said electrical means.

HAROLD RUSCHER.